(12) United States Patent
Pedersen

(10) Patent No.: US 10,145,138 B2
(45) Date of Patent: Dec. 4, 2018

(54) TOWER SEGMENT HANDLING METHOD AND APPARATUS

(71) Applicant: Vestas Wind Systems A/S, Aarhus N. (DK)

(72) Inventor: Gunnar K. Storgaard Pedersen, Skjern (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/303,537

(22) PCT Filed: Apr. 14, 2015

(86) PCT No.: PCT/DK2015/050091
§ 371 (c)(1),
(2) Date: Oct. 12, 2016

(87) PCT Pub. No.: WO2015/158350
PCT Pub. Date: Oct. 22, 2015

(65) Prior Publication Data
US 2017/0030101 A1 Feb. 2, 2017

(30) Foreign Application Priority Data
Apr. 14, 2014 (DK) .................... 2014 70216

(51) Int. Cl.
*F03D 13/20* (2016.01)
*E04H 12/08* (2006.01)
(Continued)

(52) U.S. Cl.
CPC .......... *E04H 12/085* (2013.01); *B65G 57/03* (2013.01); *B65G 57/165* (2013.01); *B65G 57/20* (2013.01);
(Continued)

(58) Field of Classification Search
CPC .......... F03D 13/10; F03D 13/20; F03D 13/40; Y02E 10/728; B66C 1/108; B66C 1/62; B66C 1/10; B66C 1/66; E04H 12/342; E04H 12/34
USPC ............ 254/94, 101; 294/67.1, 67.21, 67.31, 294/67.33, 67.34, 67.4, 67.5
See application file for complete search history.

(56) References Cited

U.S. PATENT DOCUMENTS

| 859,513 A * | 7/1907 | paige .................. B66F 3/24 212/341 |
| 2,256,896 A * | 9/1941 | Cullen ................. B66C 1/32 294/67.31 |

(Continued)

FOREIGN PATENT DOCUMENTS

| EP | 2006471 A1 | 12/2008 |
| EP | 2570658 A1 | 3/2013 |

(Continued)

OTHER PUBLICATIONS

Danish Patent and Trademark Office, Search Opinion in PA 2014 70216, Nov. 20, 2014.
(Continued)

*Primary Examiner* — Brian E Glessner
*Assistant Examiner* — Daniel J Kenny
(74) *Attorney, Agent, or Firm* — Wood Herron & Evans LLP

(57) ABSTRACT

This application relates to tower segment handling methods and apparatus, and in particular to methods and apparatus for handling segments of steel wind turbine towers. The wind turbine tower comprises a plurality of cylindrical vertical tower sections, which in the finished tower are mounted on top of one another. The vertical section of the tower has a longitudinal axis and comprises a plurality of wind turbine tower segments, the tower segments have vertical and horizontal edges and combine to form a complete vertical tower section by joining along their vertical edges. Adjacent vertical tower sections are joined to each other along the horizontal edges of the wind turbine tower segments. The tower segments have support members facilitating storage and transport of the segments. A method of assembling and disassembling a tower section on a roller bed is also disclosed.

6 Claims, 24 Drawing Sheets

(51) Int. Cl.
  *B66C 1/10* (2006.01)
  *E04H 12/10* (2006.01)
  *B65G 57/03* (2006.01)
  *B65G 57/16* (2006.01)
  *B65G 57/20* (2006.01)
  *E04H 12/34* (2006.01)
  *F03D 13/40* (2016.01)
  *B65G 67/04* (2006.01)

(52) U.S. Cl.
  CPC ............ *B66C 1/108* (2013.01); *E04H 12/10* (2013.01); *E04H 12/342* (2013.01); *F03D 13/20* (2016.05); *F03D 13/40* (2016.05); *B65G 67/04* (2013.01); *B65G 2814/0305* (2013.01); *F05B 2230/61* (2013.01); *F05B 2240/912* (2013.01); *F05B 2280/1071* (2013.01); *Y02E 10/728* (2013.01); *Y02P 70/523* (2015.11)

(56) References Cited

U.S. PATENT DOCUMENTS

| | | | | |
|---|---|---|---|---|
| 4,238,169 | A * | 12/1980 | DePriester | B62D 65/18 294/103.1 |
| 7,309,092 | B2 * | 12/2007 | Garceau | B60P 3/34 296/171 |
| 2006/0213145 | A1 * | 9/2006 | Haller | E04H 12/34 52/651.01 |
| 2009/0090069 | A1 | 4/2009 | Willis | |
| 2009/0107062 | A1 * | 4/2009 | Pedersen | B66C 1/108 52/223.13 |
| 2011/0187139 | A1 * | 8/2011 | Wegeler | B66C 1/10 294/86.41 |
| 2013/0180199 | A1 | 7/2013 | Vadlamudi et al. | |
| 2013/0307282 | A1 | 11/2013 | Belder et al. | |

FOREIGN PATENT DOCUMENTS

| | | |
|---|---|---|
| EP | 2664790 A2 | 11/2013 |
| WO | 2004083633 A1 | 9/2004 |
| WO | 2006101632 A2 | 9/2006 |
| WO | 2013097865 A1 | 7/2013 |
| WO | 2013117660 A1 | 8/2013 |

OTHER PUBLICATIONS

European Patent Office, International Search Report and Written Opinion in PCT Application No. PCT/DK2015/050091, Aug. 6, 2015.

* cited by examiner

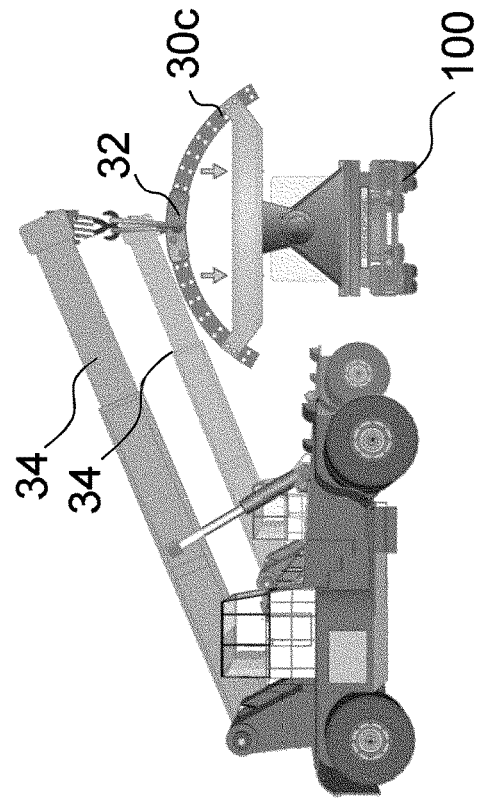
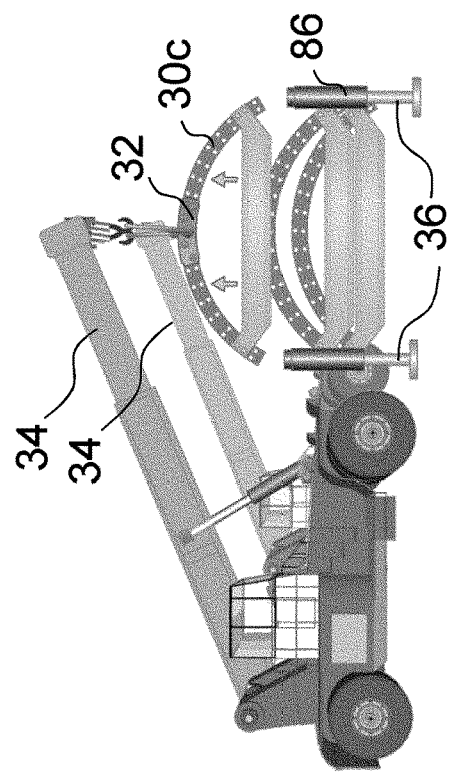
FIGURE 10A
FIGURE 10B

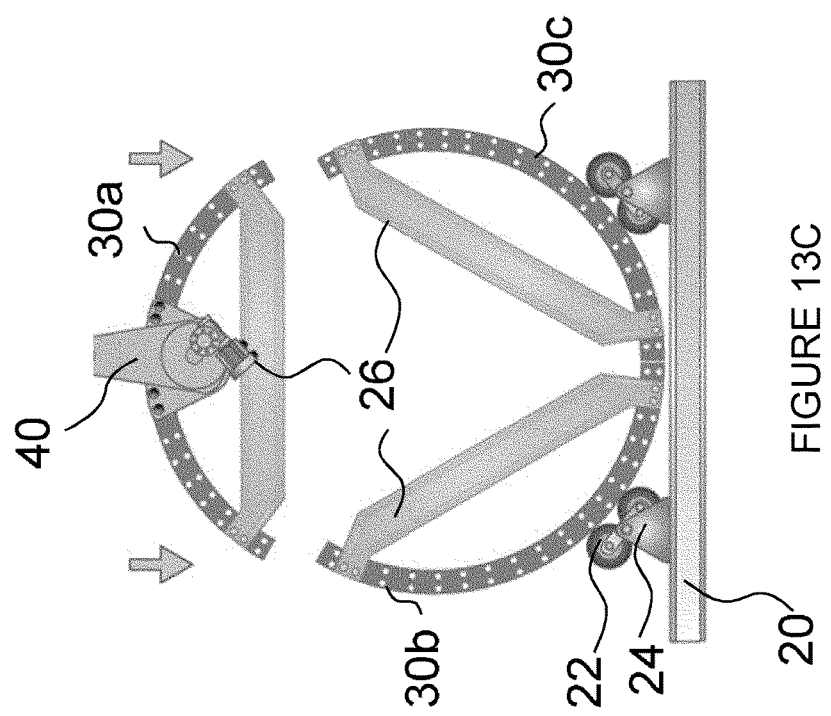

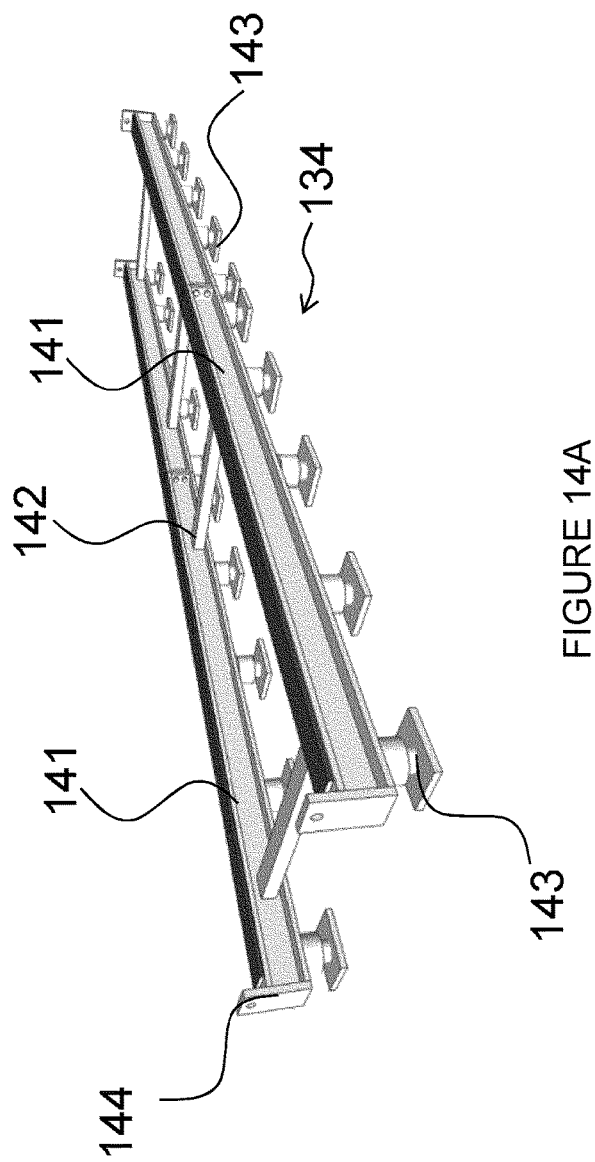

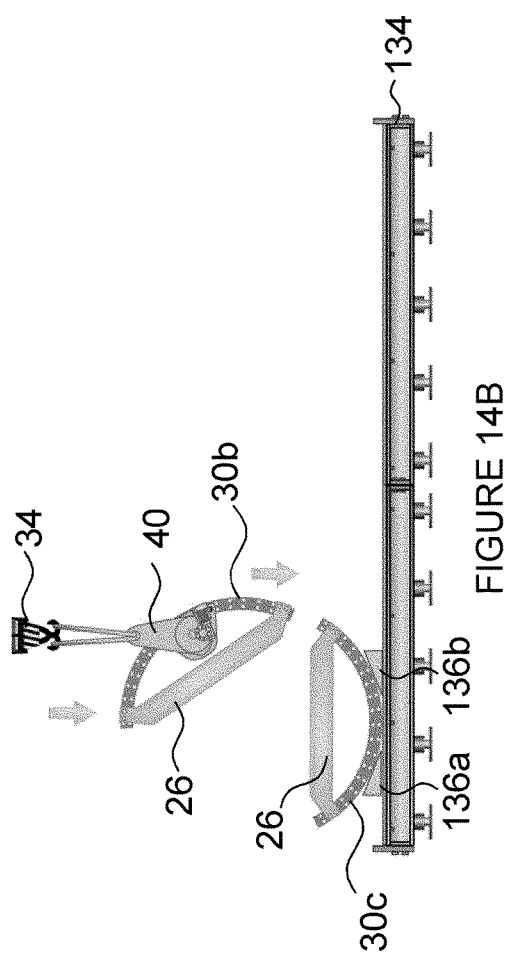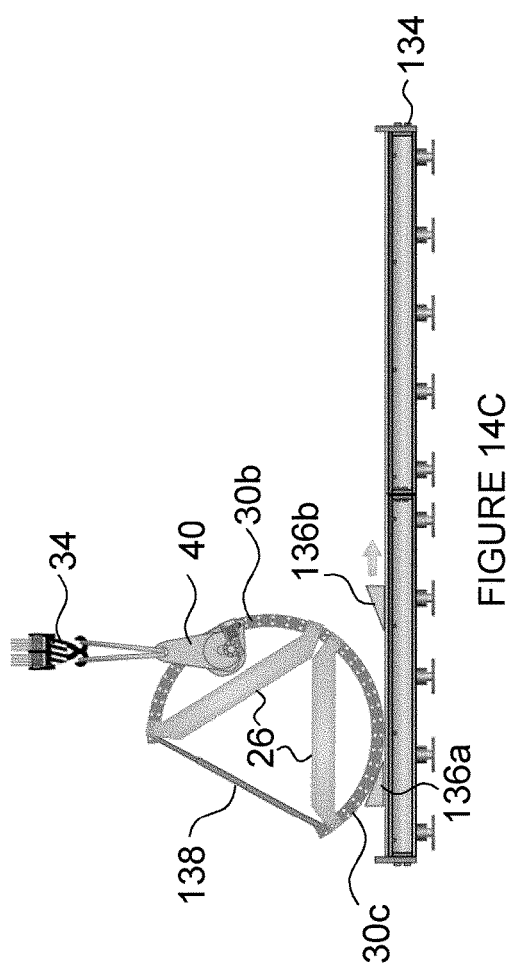

TOWER SEGMENT HANDLING METHOD AND APPARATUS

This invention relates to tower segment handling methods and apparatus, and in particular to methods and apparatus for handling segments of steel wind turbine towers, and to the transport of the segments to a wind turbine construction site.

The increasing demand for wind energy may be met both by building more wind parks and by building wind parks capable of generating more energy per turbine. Generating more energy per turbine requires wind turbines with larger generators, which in turn need larger blades to capture more energy from the incident wind. Such turbines also require wider and taller towers to support the blades, nacelle and other components. The increasing physical dimensions of modern wind turbine towers lead to difficulties in transporting the tower from the manufacturing site to the installation site where the wind turbine is to be constructed. This is particularly true if the wind turbine tower or parts of the wind turbine tower are to be transported by road, for example on the trailer of a truck, causing potential disruption to other road users.

Wind turbine towers may therefore be transported as a series of prefabricated parts which are assembled into the tower at the installation site. Although the use of prefabricated tower parts makes transport easier, additional overhead is placed on the pre-transport and assembly processes as a result of the larger number of component parts that need to moved and handled. Such a tower is described in WO2004/083633, filed on 19 Mar. 2003, which is hereby incorporated by reference. Further, due to variations in individual manufacturing processes prefabricated sections may not always fit together as readily as would be desired, resulting in more intensive labour at the construction site. In addition, the prefabricated parts may need to be assembled into towers that taper from a wider base to a smaller diameter towards the top. This means that the prefabricated parts may be of different physical dimensions to one another and thus require more complex handling and transport.

Even if prefabricated tower parts are used, they may still often be too large for conventional road transport to be possible. Whilst reducing the size of the prefabricated parts overcomes this problem, it brings significant disadvantages, particularly due to increased construction costs because more time has to be spent assembling the tower. We have therefore appreciated that it is desirable to provide an improved wind turbine tower section handling method.

SUMMARY OF THE INVENTION

The invention is defined in the independent claims to which reference should now be made. Advantageous features are set out in the dependent claims.

BRIEF DESCRIPTION OF THE DRAWINGS

Embodiments of the invention will now be described, by way of example only, and with reference to the accompanying drawings, in which:

FIGS. 10A and 10B illustrate the unloading of the segments onto the trailer of a truck;

FIGS. 13A to 13C illustrate the partial formation of a tower section using a roller bed;

FIGS. 14A to 14E illustrate the partial formation of a tower section using a flat bed, in an alternative embodiment;

DETAILED DESCRIPTION

Figure 1:
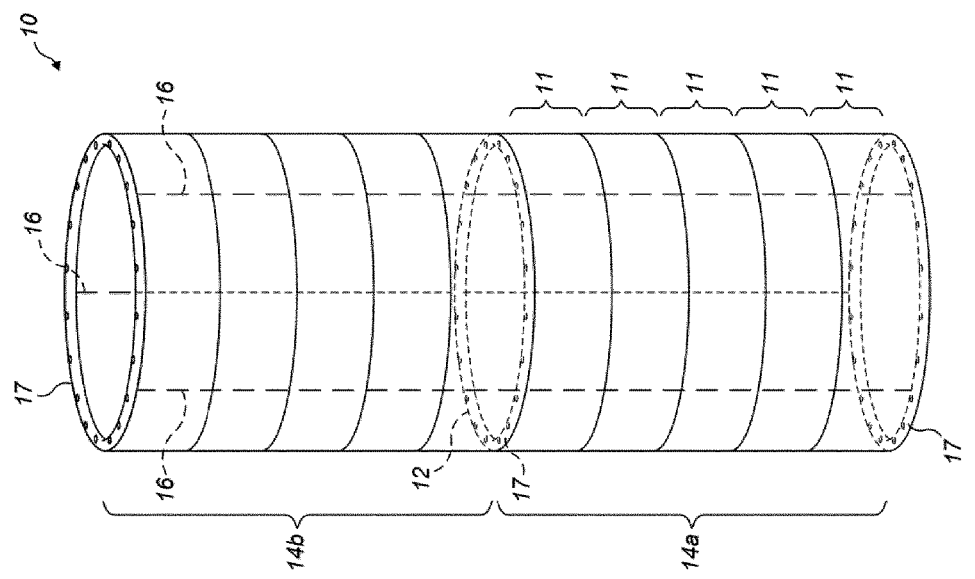
FIG. 1 is a diagram of part of a wind turbine tower, showing the shells from which it is constructed, the lines along which the tower is cut into sections and segments, and the horizontal flanges.

Wind turbine towers may be constructed from a plurality of steel shells joined together by means of bolted or welded joints. The plurality of steel shells are circular in cross section and may have diameters that are greater for the shells used at the base section of the tower and smaller for sections used at the top. This gives the tower a tapered shape with a wider base, providing a structure strong enough to support the nacelle and the components housed within it, and to resist the lateral forces from the wind and rotor blades. The steel shells are often manufactured at a tower production site and joined, such as by welding, together into vertical sections of the tower for transport to a construction or installation site. The shells can also be frusto-conical in shape.

A vertical section of the tower may therefore be made up of a plurality of steel shells. The vertical sections of the tower may be cut into segments for ease of transport as described in WO 2004/083633 A1, filed on 19 Mar. 2003, which is hereby incorporated by reference. Transport may potentially be over both land and sea.

The segments are secured to one another to form a tower section by means of vertical flanges located along the interior of the segments at their vertical edges. The flanges of adjacent segments can be joined using bolts inserted through bolt holes in the flanges. Flanges are also attached to the periphery of the open ends of the vertical section so the tower sections, once mounted on top of each other, can be joined together. Similarly, the flanges of adjacent segments and sections are joined using bolts inserted through bolt holes in the flanges.

Once the vertical tower sections are assembled into a tower, the flanges attached to the open ends of the vertical sections will be orientated horizontally, and will be joined to corresponding flanges on the neighbouring sections. In use, the interior longitudinal flanges will be orientated vertically. The terms horizontal and vertical flanges will therefore be used herein to distinguish the two types of flanges from one another.

The process of first forming a complete tower section and subsequently cutting the vertical section into segments assists the segments in fitting together properly when they are reassembled at the installation site. This technique is therefore in contrast to methods where individual segments are separately manufactured and then assembled into a vertical section for the first time at the installation site. When the segments are reassembled into the vertical sections, the longitudinal edges of the segments are joined along the vertical flanges provided on the interior of the tower section. Alternatively, the segments can be manufactured as single parts without cutting them out from a complete tower section.

The use of the word vertical with regard to the sections and the flanges is to indicate their orientation once installed in the tower, and is not therefore intended to be used in a limiting way with regard to the method of production or assembly. As will be explained below, the handling, disassembly and reassembly processes are more conveniently carried out while the tower section is laid horizontally.

FIG. 1 shows a partial span 10 of an assembled wind turbine tower, the tower being constructed from several shells 11 being welded or bolted together. For clarity only the lower five shells 11 are labelled in FIG. 1, but it will be appreciated that the shell structure continues along the length of the tower span 10.

Span 10 is shown as comprising two vertical sections 14a and 14b joined together to one another at horizontal join 12. Horizontal flanges 17 are located at the horizontal joins 12, and at the top and bottom of the span 10, in order to allow adjacent sections to be connected together. A tower will often be made up of many vertical sections, depending on its height. In practice, the opposing horizontal flanges 17 located on the open ends of the respective vertical sections are brought together using lifting machinery, such as a tower crane, and the vertical sections are then secured to one another using bolts passing through bolt holes in the horizontal flanges 17.

As noted above, it is desirable to transport the vertical sections as respective segments which are then reassembled at the installation site. In the example shown in FIG. 1, each of the sections 14a and 14b are formed by three segments joined together at vertical joins 16 running parallel to the axis of rotational symmetry of the tower. In alternative embodiments each vertical section may be formed of more or fewer segments. Further, the number of segments from which each section is formed may differ depending on where in the tower the section will be located. As the diameter of the tower is largest at the bottom, the vertical sections for this part of the tower may be divided into more segments than sections from the top of the tower where the diameter is smaller. In this example, the base section or sections of the tower may for example comprise four segments, while the section or sections at the top may comprise only two segments. The segments are joined to one another by bolting along the complementary vertical flanges arranged on their interior surface. The vertical flanges cannot be seen in FIG. 1. As will be described below, joining the segments together into the vertical sections is preferably carried out before the step of assembling the vertical sections into the tower. The segments may be arranged horizontally while they are joined to one another. Furthermore, although the segments of the respective vertical sections are shown as being aligned in FIG. 1, the segments in adjacent sections need not be arranged in alignment with one another, but may be offset in the azimuthal direction.

As mentioned above, securing the segments together using vertical flanges to make sections, and securing the sections together using horizontal flanges in order to construct the tower, is known from published patent application number WO 2004/083633 A1, filed on 19 Mar. 2003, which is hereby incorporated by reference.

The segments may have substantially the same arc length and therefore subtend substantially the same angle with respect to the centre of the tower section. Alternatively, it may be preferable to cut the tower section into segments of unequal arc lengths.

The wind turbine towers described and illustrated herein are cylindrical in shape. They may also be tapered so that the diameter of the tower at the base is greater than the diameter of tower near the nacelle. Although a cylinder with a circular cross-section has been described, the cross-section may also be elliptical, polygonal, or generally polygonal, that is polygonal but with curved or rounded edges. For polygonal cross-sections, the segments of the vertical wind turbine sections can be formed so that once assembled the vertical edges of the segments are positioned mid-way or partially mid-way along the sides of the surface, rather than at the vertices of the cylinder. This will mean that the segments will have a curved, angled or bent surface profile between the two vertical edges.

Figure 2:
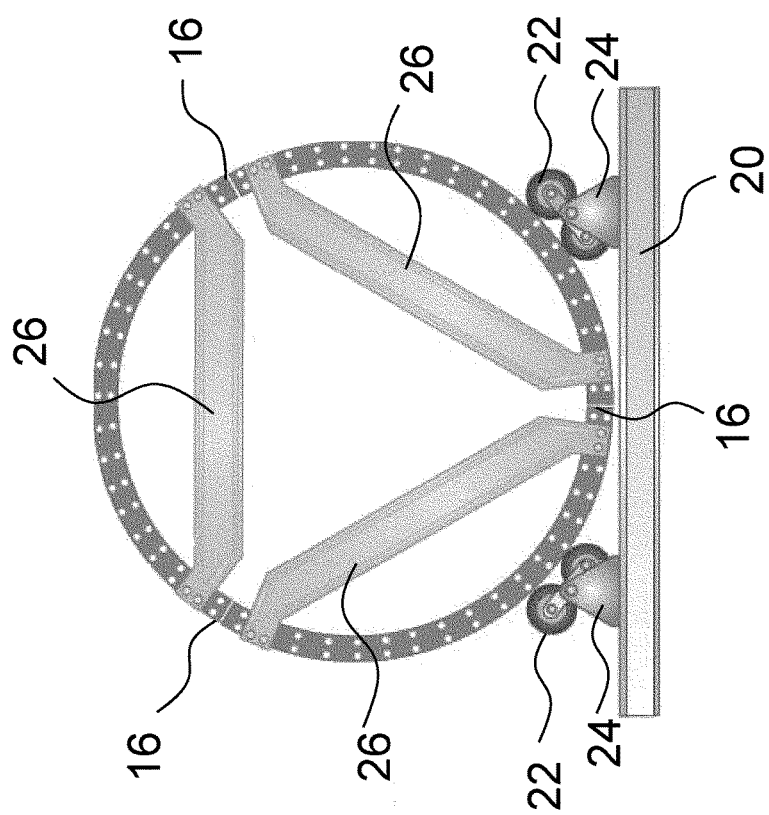
FIG. 2 is an elevation view of a section of tower resting on a roller bed with supports added.

FIG. 2 shows an elevation view of the end of a wind turbine tower section. The horizontal flange connected to the end most steel shell in the tower section, and the plurality of bolt holes in the horizontal flange can also be seen in the Figure. Three handling support members 26 are attached to the horizontal flange of the tower section as shown in FIG. 2, with one handling support member attached to each end of each segment. The handling support members 26 are also provided at the far end of the vertical section shown in FIG. 2, although this cannot be seen in the diagram. The handling support members 26 may be releasably secured to the horizontal section with bolts. The handling support members 26 are arranged substantially along one or more chords of the circle made by the tower in cross section in a triangular configuration with gaps between the locations where they are joined to the flange.

The handling support members 26 are preferably made of a material with a high tensile strength, such as steel, and comprise a central straight section and angled shoulders where the handling support members 26 join the horizontal flange to provide an intermediate gap. The ends of each handling support member can therefore be fixed to the tower section without overlapping the ends of adjacent support members 26. Further, the gaps between the ends of adjacent support members 26 occur where the longitudinal edges of the segment fall, so that the segments can be easily detached from one another (after cutting in the manufacturing process) and reassembled without the handling support members interfering with each other.

When not assembled into the tower, the supports 26 act to maintain the shape of the segments by providing them with structural support. Further the handling support members 26 allow respective tower segments to be stacked on top of one another, with the point of contact and weight of the segments being borne predominantly by the stacked handling support members 26 of each segment. Some weight may also be borne by the curved segments shells resting on one another. The angled shoulders and central straight portion of the handling support members have a shape that tessellates with the handling support members of other segments so that the segments and the handling support members can stack.

As the handling support members are joined to the ends of the segments by means of the horizontal flange they may extend beyond the span of the segment forming an abutting structure at the exterior of the segment. At least two handling support members are needed for each segment, provided at both ends of each tower segment. Alternatively, the handling support members may be positioned inside the span of the segment, although in this embodiment the support members are not stacked on top of one another but instead stack upon the shell. The support members may then have a complementary profile to that of the shell in order to increase the surface area of contact between them. Further, three supporting members may be used, two of which are located at either end of the segments with a third supporting member is located midway along the segment.

In some embodiments one or more intermediate supports may also be fitted midway along the tower section and secured to the vertical flanges.

In FIG. 2, the tower section rests upon a support or roller bed 20, comprising a flat base to which pairs of rollers 22 are mounted by means of the brackets 24. The brackets 24 provide a hinged connection to the roller pairs 22, allowing the roller pairs 22 to swivel and thereby accommodate tower segments or sections of different sizes. In alternative embodiments more or fewer rollers may be mounted to each bracket. The rollers may extend continuously along the length of the roller bed, or groups of shorter rollers may be provided at various distances along the length of the roller bed. In this latter case, as a minimum it will be required to have one set of rollers at or close to each end of the tower section, in order to ensure that the section is properly supported. Thus in some embodiments at least one roller bed at each end of the tower section will be required.

The use of a roller bed allows the tower section to be conveniently rotated. In alternative embodiments a simple flat bed may be used with chocks supporting the tower section and preventing it from rolling on the flat bed. In some of these embodiments the flat bed takes the form of two or more parallel rails, along which the tower section can be rolled. Chocks can be inserted between the tower section and the rails. Preferably, one rail or beam is provided at each end of the tower section, and the rails or beams have a coating to ensure that they do not damage the surface of the wind turbine tower. Suitable materials for the coating include rubber, wood or other resilient plastic materials for example, that will support but not damage the exterior surface of the tower segment or section.

The roller bed shown in FIG. 2 may be used both at the production site and at the installation site to provide support for a vertical section of the tower that is in transit between the production site and the installation site.

Figure 3:
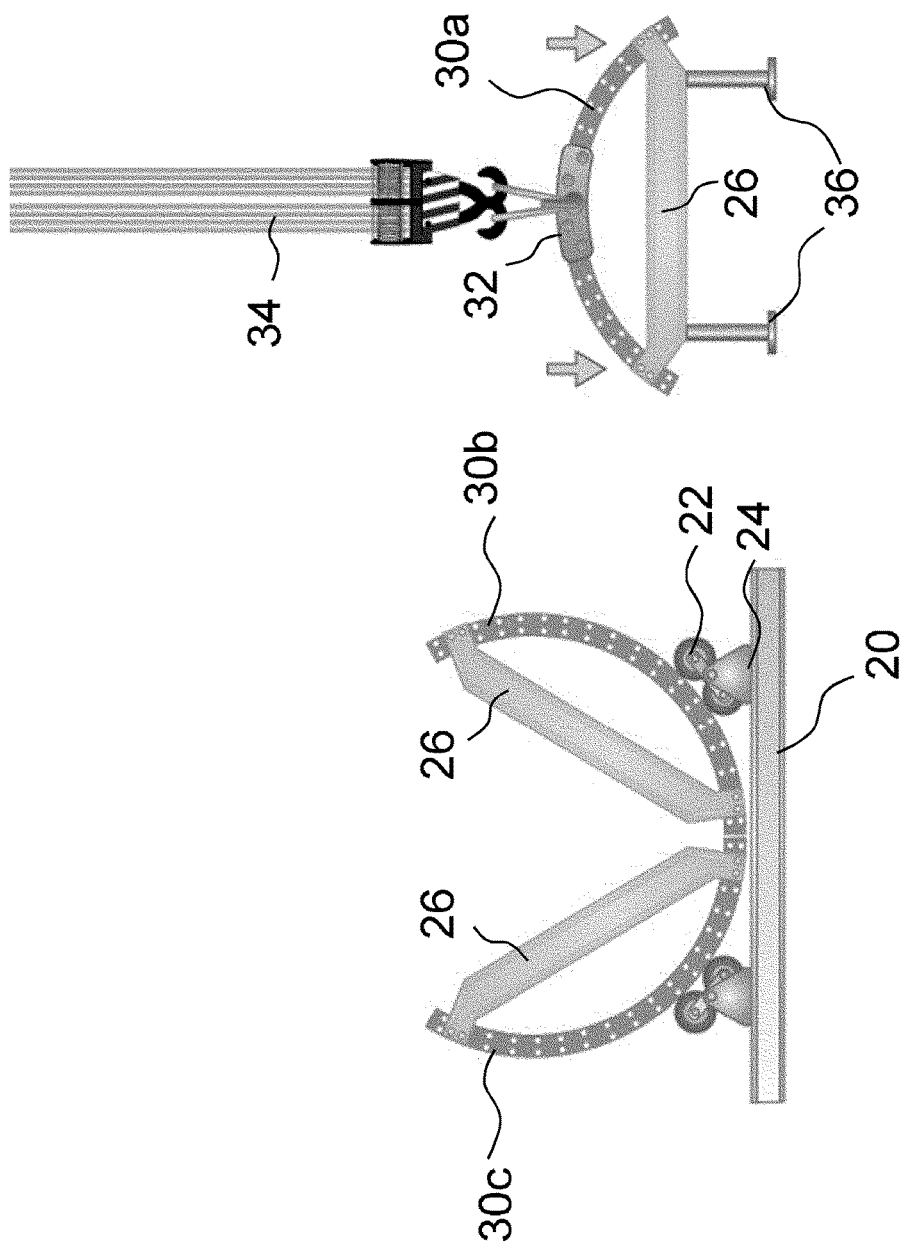
FIG. 3 illustrates a first segment being removed from the section and being prepared for transport.

A method of handling and preparing the towers segment for transport will now be described. FIG. 3 shows how a first segment 30a, which was originally located furthest from the roller bed 20, at the top of the vertical section in FIG. 2, is lifted away from the other two segments 30b and 30c. In order to perform the lifting it will be appreciated that the bolts along the vertical flanges securing the segment 30a to its neighbouring segments 30b and 30c will have been released.

The lifting is achieved by securing a lifting tool 32 to the segment. In this example, the lifting tool is a bracket 32, which is bolted or which grips onto to the horizontal flange of the segment 30a. A crane 34 then engages with the bracket 32, by means of one or more hooks and loops, in order to lift the segment 30a. Preferably the bracket 32 is mounted directly above the centre of gravity of the segment 30a to prevent the segment from rotating when it is lifted by the crane 34. Two cranes 34, one at each end of the segment, operate together to perform this lifting in order to provide sufficient support to the segment.

Crane 34 lowers the segment 30a onto a transport frame 36, such that the handling support member 26 makes contact with the frame and supports the segment 30a above it. As shown in FIG. 3, the handling support members 26 are shaped to allow them to be stable upon the transport frame 36 when the crane 34 lowers them onto it. The support and stability is possible due to the central straight section.

The transport frame has at least a pair of support legs and an optional upper load bearing surface for supporting the handling support members attached to the segment 30a. This is shown on the right side of FIG. 3. The transport support frame shown may be comprised of a pair of legs on which the segment can rest. More than one transport frame 36 may be provided, for example one at each end of the segment 30a, in order to properly support the segment 30a. The legs of the transport 36 may be hydraulically extendable and retractable to allow the height of the segments above the ground to be adjusted. Other extending and retracting means may be used for the legs of the transport frame 36, for example the legs may comprise pneumatic pistons or mechanical jacks.

Figures 4A, 4B:
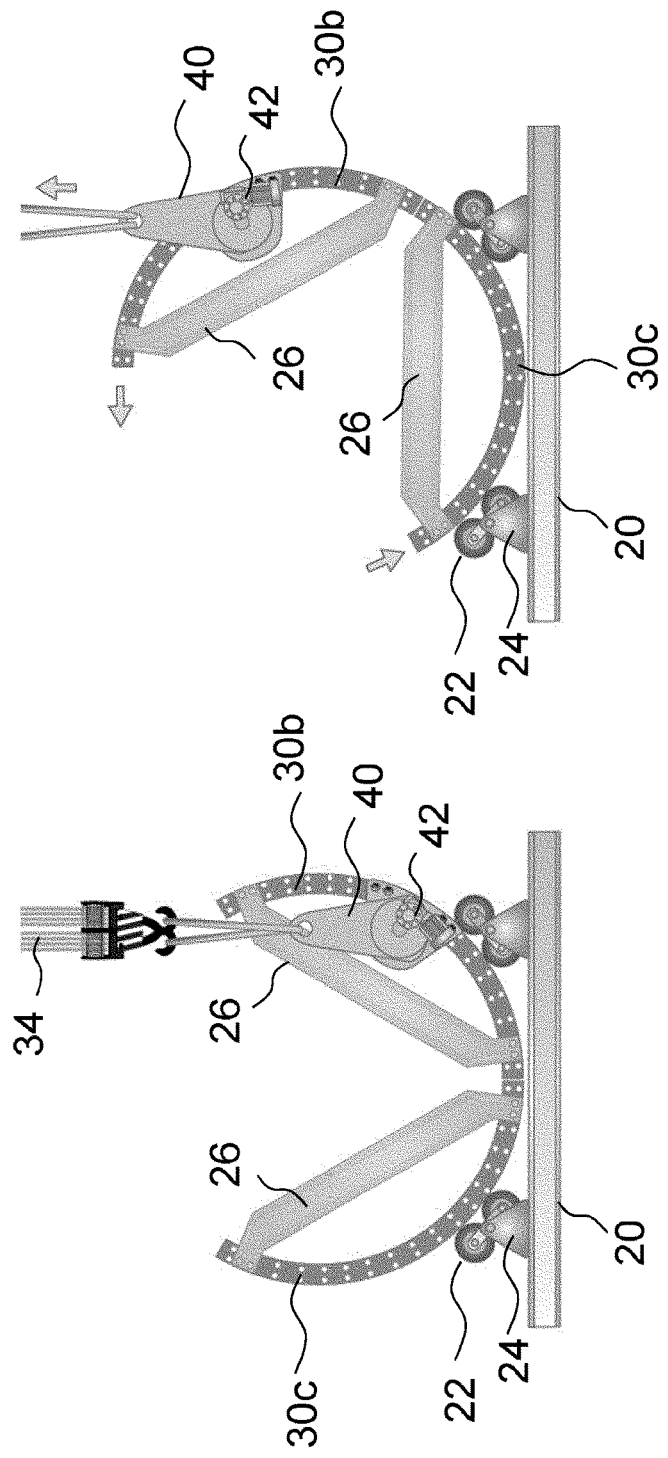
FIGS. 4A and 4B illustrate a crane prepared for lifting a second segment from the section.

FIGS. 4A and 4B illustrate the procedure for dismounting the remaining segments 30b and 30c for transport. Rotating lifting tool 40, having a mounting bracket for connection to the horizontal flange, is attached to the crane 34 for example by means of hooks and loops. The mounting bracket is subsequently bolted onto, or grips onto, the horizontal flange of the segment 30b. The rotational lifting tool 40 is equipped with rotation means 42 which rotates about its longitudinal axis, allowing the angle of the segment 30b to which the mounting bracket is connected to be adjusted relative to the crane 34. Rotation means 42 comprises, for example, an electric motor and gear system in order to rotate segment 30b in a controlled way at the same time as it is lifted by the crane 34. Thus, segment 30b, which describes an arc of a circle when viewed in cross section, initially remains on the circumference of the same circle as it is lifted and rotated, as shown in FIG. 4B. This allows segment 30c to rotate in a controlled manner, under the effect of gravity and from the complementary lifting force applied to segment 30b, from the position shown in FIG. 4A to that shown in FIG. 4B. The bolts along the vertical flanges connecting the two segments 30b and 30c can then be disconnected, and the segment 30b is then lifted by the crane 34, leaving only the segment 30c on the roller bed.

Figure 4C:
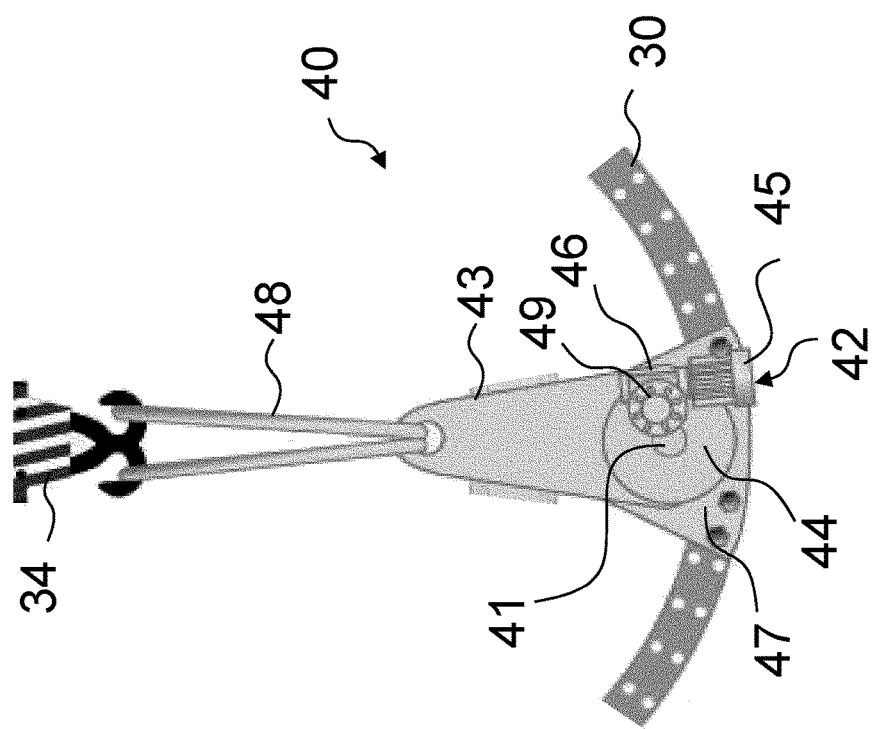
FIG. 4C illustrates a rotational lifting tool for use with a segment.

FIG. 4C shows the rotational lifting tool 40 in more detail. The rotational lifting tool generally comprises a tool body having a first 43 and second section 47 connected at a mutual pivot 41, the pivot defining a rotational axis around which the second section of the tool body rotates with respect to the first section. A first connector is provided on the first section of the tool body, for coupling with the crane 34. The first connector may couple to the lifting cable or hook or lifting arm of a crane, or of a lifting vehicle. In use, the lifting tool may be suspended vertically by the first connector. The second section 47 has a second connector for engaging with the horizontal flange of the wind turbine segment. The rotational means 42 of the tool has an actuator for driving the second section 47 of the tool body around the rotational axis, and a lock for locking the second section of the tool body in place with respect to the first section.

As can be seen in FIG. 4C, the first section comprises mounting member 43a and first connector comprises loops or chains 48. The mounting member 43a can then be connected to the hooks of the crane 34 by means of the loops or chains 48. The mounting member 43a also holds, by means of the rotation means or rotatable mounting 42, the second section or bracket 47, which is attached by means of bolts to a segment 30 of a wind turbine tower. In this example, the actuator is an electric motor 45 mounted to the bracket or the mounting member 43a and which drives a worm gear 46. The worm gear 46 engages with gear wheel 49 in order to rotate the gear wheel 49 during operation. As the gear wheel 49, which is offset from the centre of wheel 44, turns, its position rotates about the central axis of wheel 44 due to the engagement between the teeth of wheel 49 and those on wheel 44 (not shown in the figure). As wheel 44 is rigidly connected to the mounting member 43a, such an action causes the mounting bracket 47, together with the motor 45 and worm gear 46, to rotate relative to the mounting member 43a. This therefore allows the segment 30 to be rotated by an arbitrary angle about its longitudinal axis.

FIG. 4C shows a view of first rotational lifting tool connected to a first end of the segment 30. A second rotational lifting tool may also be connected to a second end of the segment 30, the second rotational lifting tool also being held up by a crane. In order to ensure that the two ends of the segment 30 are rotated at the same rate and by the same amount, the motors 45 of the first and second rotational lifting tools are synchronized in the turning motion they provide to worm gears 46.

As will be appreciated by the skilled person, the details of the gear arrangement described in the above example embodiment of the rotational lifting tool may vary depending on the required torque and speed of rotation at the bracket 47, as well as the precise characteristics of the motor 45. Furthermore, although the arrangement in FIG. 4C shows the bracket 47 bolted onto the horizontal flange at the end of a segment 30, in alternative embodiments the bracket 47 may be connected to a support member, a vertical flange, or a part of the shell making up the segment 30. The first and second rotational lifting tools may be mounted in different ways at each end of the segment 30.

Figure 5:
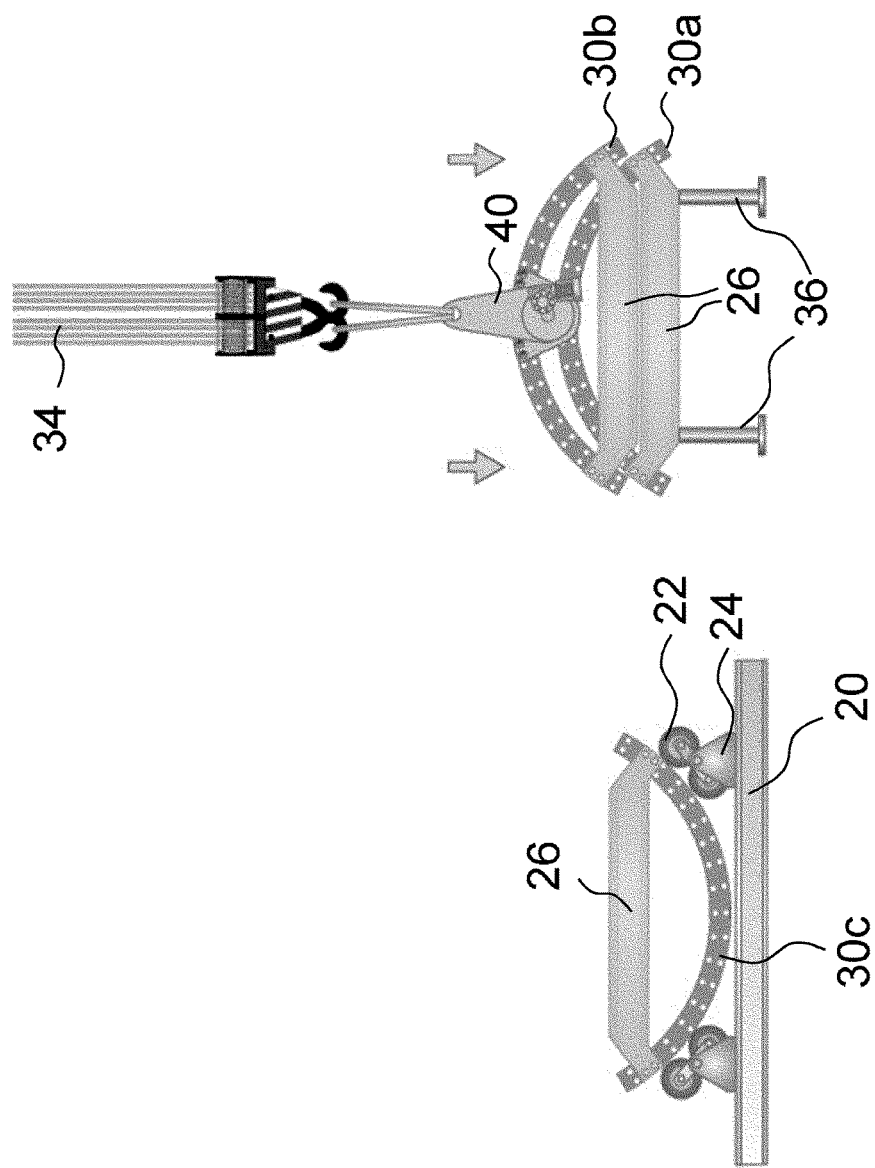
FIG. 5 illustrates the second segment being prepared for transport.

FIG. 5 shows the crane 34 lowering the segment 30b and its handling support member 26 to be stacked on top of segment 30a and its handling support member 26. The mounting bracket 40 rotates the segment 30b such that it has the same orientation as segment 30a, allowing the two segments to stack neatly on top of one another. The supports 26 are arranged so as to be easily stackable.

Figure 6B:
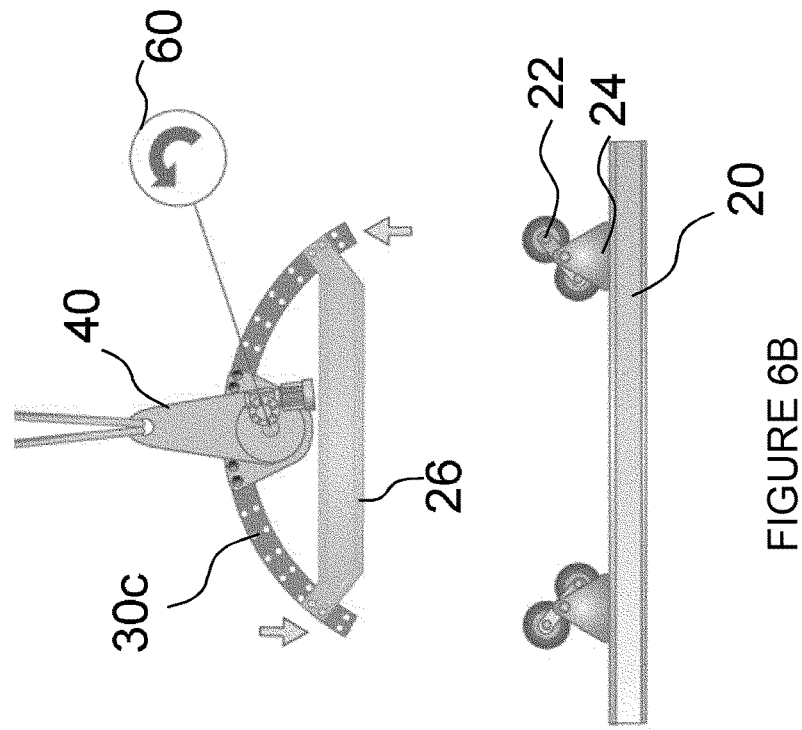
FIGS. 6A and 6B illustrate a third segment being rotated prior to being prepared for transport.
Figure 6A:
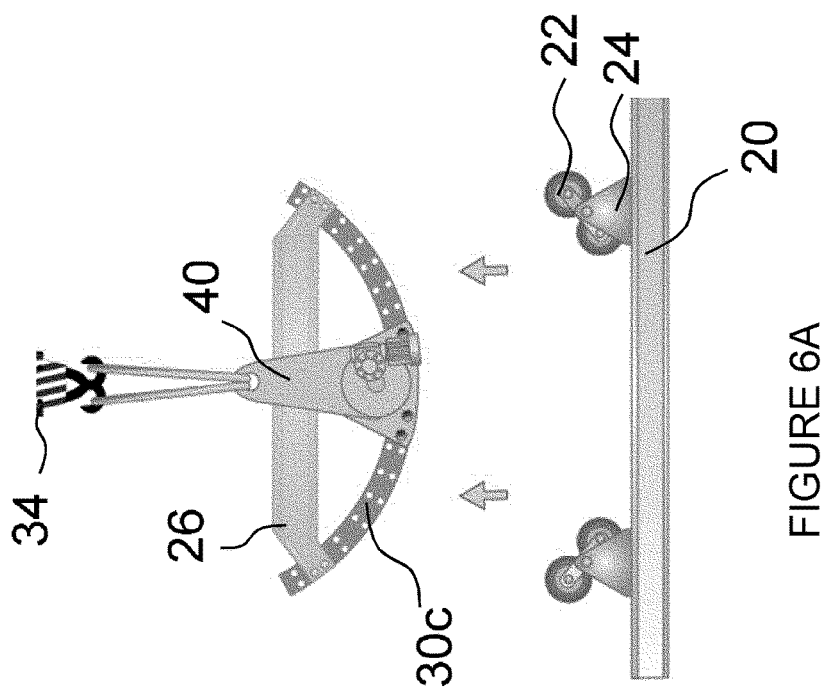
Figure 7A:
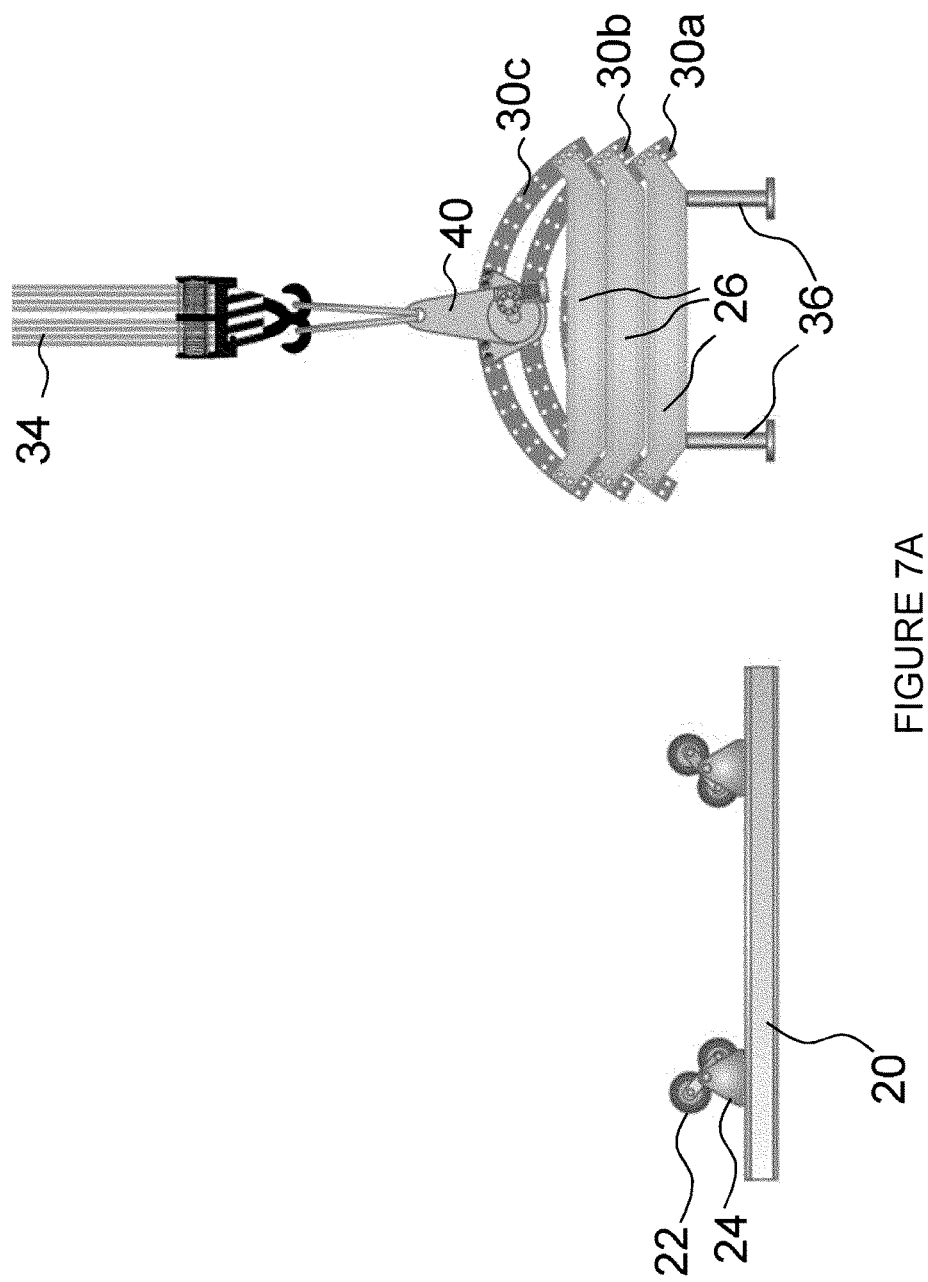
FIG. 7A illustrates a complete stack of segments.

In FIG. 6A, the mounting bracket 40 is attached to the final segment 30c of the tower section, and the crane 34 lifts the segment clear of the roller bed 20. FIG. 6B shows the segment 30c being rotated by 180 degrees as shown by the arrow 60. As shown in FIG. 7A, this then enables the segment 30c to be stacked on top of the other two segments 30b and 30a by lowering the crane 34. Optionally, the segments may then be secured to one another using cables wound around the handling support members 26.

Figure 7B:
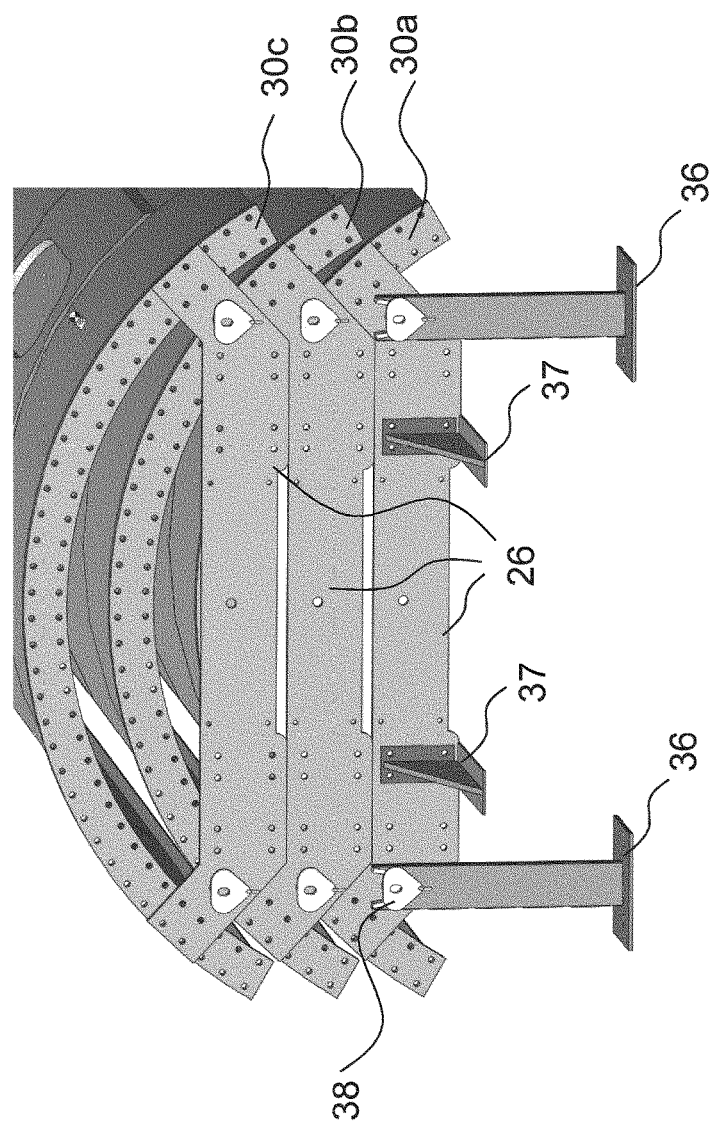
FIGS. 7B and 7C illustrate how different supports stack together.

FIG. 7B is a perspective view showing how the support members 26, located at the end of segments 30a, 30b, 30c, allow the segments to stack on top of one another. The angled parts of support members 26, which are joined to the flanges at the ends of segments 30a, 30b, 30c, act to secure a support member stacked on top of it. The lowest support member 26 may be secured to transport frame 36. The handling support members can be seen to comprise opposing or complementary load bearing surfaces formed by the straight and angled sections of the handling support member. The load bearing surfaces of one handling support member engage with the complementary load bearing surfaces of the other handling support members in the stack. In this way, the plurality of wind turbine tower segments are stackable on top of one another when the tower section is not assembled.

The support members have bolt holes to which tools, such as lifting tools, engagement tools, or stabilisation tools may be secured to assist the transport or storage of the segments. In FIG. 7B, a stabilisation tool 37 in the shape of one or more feet is attached to the support member 26 of the lowest segment. The stabilisation tool may assist the stack of segments when they are loaded onto a transport vehicle. Furthermore, engagement tools 38 are secured to the support member for engaging with a corresponding recess provided in the stand or transport frame 36. Only the engagement tools 38 of the lower most support member will engage the recesses in the transport frame 36. In this example, the engagement tool and the corresponding recess are indicated as triangular in shape, although any complementary pairs of shapes may be possible. As explained earlier, the legs can be hydraulically or electrically actuated to raise and lower the stack of segments.

Figure 7C:
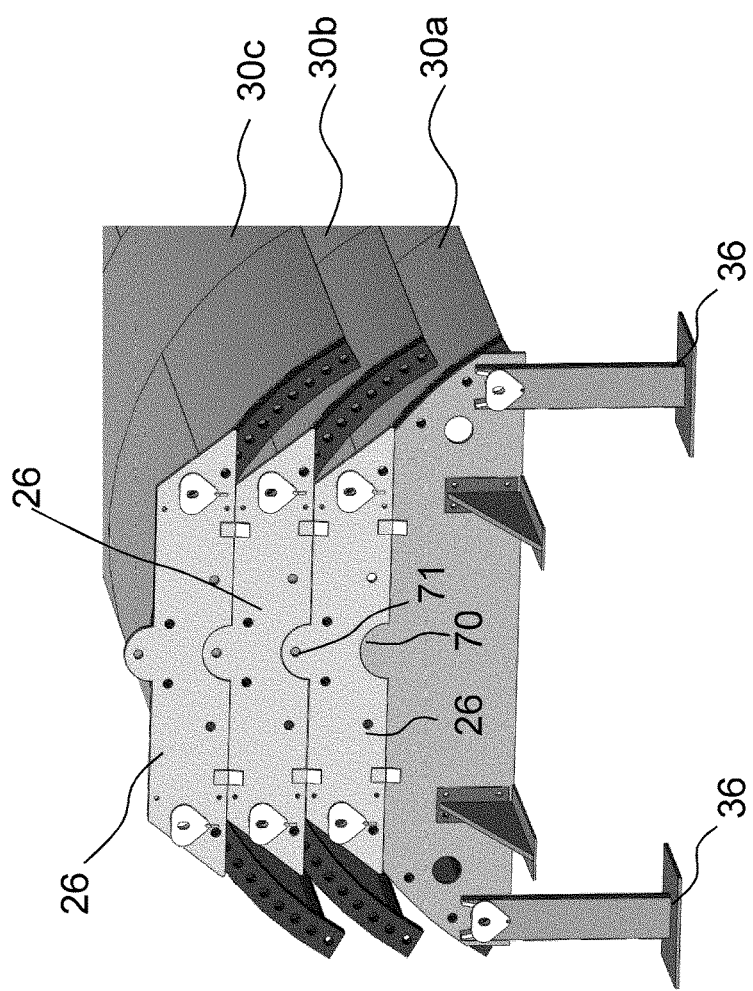

FIG. 7C is a perspective view of an alternative embodiment, in which the support members 26 have a different shape. In FIG. 7B it will be appreciated that the support members are positioned inside the curved surface of the segment, that is in the interior of the tower section once it is assembled. In FIG. 7C, the support members 26 are positioned to protrude beyond the exterior of the curved sheet, with a smaller portion of the support member remaining in the interior. As a result, the segments sits lower on the support member than in the case shown in FIG. 7B. In this example, the support members are straight sections across their entire length and do not require the angled shoulders to join them to the horizontal flanges. Furthermore, the support member including in the opposing surfaces a protrusion 71 and complementary cut-out section 70 to allow adjacent support members 26 to stack centrally on top of one another and lock against one another. The protrusion and recess prevent the segments from sliding across each other in the stack. The protrusion and recess shown in FIG. 7C may also be used in the example of FIG. 7B if desired. However, in FIG. 7B the angled shoulders and straight section fit together in such a way that sideways movement of a segment across the other is prevented. Other shapes for the support members 26 which allow them to be conveniently stacked are equally possible as will be appreciated by the skilled person.

Figure 8:
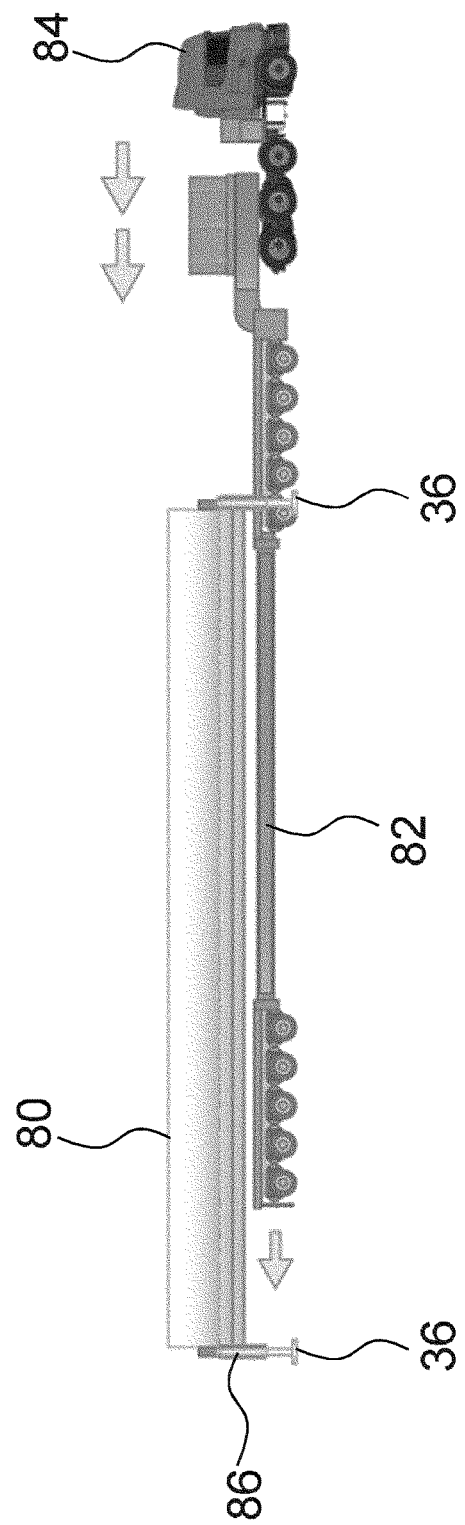
FIG. 8 illustrates the segment stack being loaded onto the trailer of a truck.

As shown in FIG. 8, the stack of segments 80 is positioned on the trailer 82 of a truck 84. This process may be accomplished by ensuring that the spacing between the support legs of the transport frames are spaced further apart than the width of the flat bed of the trailer. The trailer may then be reversed under the transport frame 26 and the hydraulic legs lowered so that the stack of segments 30 is brought into contact with the trailer flat bed. The hydraulic legs may then be removed. Alternatively, the whole stack may be lifted by crane from the transport frame directly onto the trailer, or the stack and the transport frame may be lifted by crane onto the flat bed and the frame subsequently removed.

In an alternative embodiment, the support legs of the transport frame may be connected to each other by an upper bearing surface on which the handling support members of the segments rest. Transport of the segments may then occur on the flat bed trailer while the transport frame is still in place.

Figure 9:
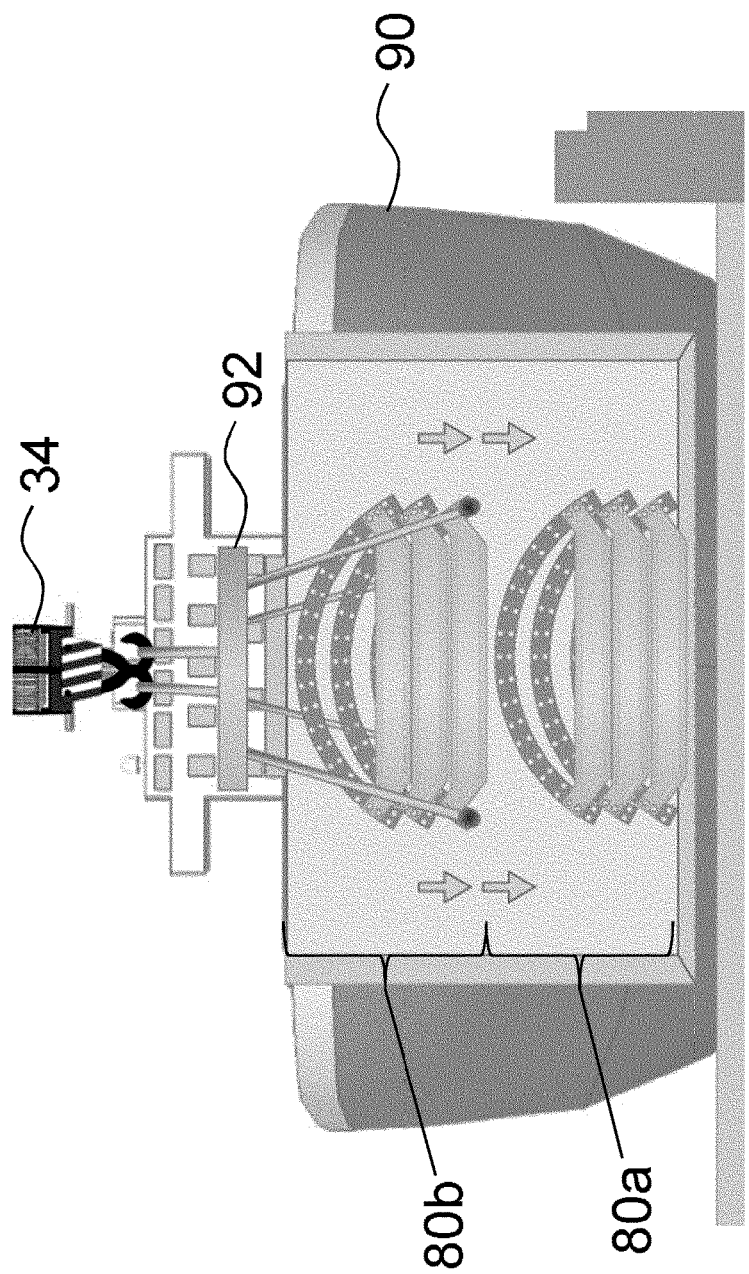
FIG. 9 illustrates segment stacks being loaded into the cargo hold of a ship.

It is likely that the segments of the wind turbine tower now loaded onto the trailer will also require transport by sea before they reach the site where the wind turbine tower is to be installed. FIG. 9 shows how one or more stacks of segments 80a, 80b may be loaded into the cargo hold of a ship 90, for transportation over water. One or more cranes 34 are attached by means of hooks and loops to lifting gear 92 which is used to lower the stacks of segments 80a, 80b into the cargo hold. Cables run from the lifting crane onto attachment points secured to the segments. This may be for example be provided in one or more bolt holes, or via brackets secured to the bolt holes of the horizontal flange.

In this diagram, the stacks are shown as removed from the transport frame, however, in alternative embodiments, the transport frame may be retained with the stack of segments to aid in the further transport. It will be appreciated however that the transport frame is optional, and that in the same way stacks may be formed from separate segments resting on each other by their handling support members, separate stacks may rest on each other in the same way.

A complementary lifting process may be used to unload the segment stacks from the cargo hold. Depending on the size of the cargo hold, more than two stacks of segments may be arranged on top of one other for transportation. For smaller vessels this will not be possible and the cargo will be only one stack deep.

As will be appreciated by the skilled person, the techniques described above may be used to load a stack or stacks of segments 80a, 80b into the cargo hold of an aircraft, onto a trailer of a freight train, or onto any other vehicle capable of transportation of the segments.

Once the segments 30 have arrived at their destination, via appropriate use of land, sea or air transport, it is necessary to disassemble the stacks and reassemble the tower sections from the segments. FIG. 10A shows how a stack of segments may be unloaded using a mobile transport crane by way of example. In FIG. 10A, the entire stack of segments has been placed onto a transport frame 36 from a trailer. The transport frame 36 may include hydraulic sections 86 to raise the stack of segments and allow the trailer delivering the segments (not show in this figure) to be removed. Alternatively, the stack may be lowered onto the transport frame 36 by a mobile crane, for example if the stack has been offloaded from a ship. Lifting tools, such as brackets 32 are then bolted to or grip the segment 30c before cranes 34 lift the segment 30c. It may be desirable to locate one crane 34 at either end of the segment 30c, or, if a larger single crane is used, to locate the crane in the middle of the segment. FIG. 10B shows how, having lifted the segment 30c, the cranes 34 lower the segment onto trailer 100.

Figure 11:
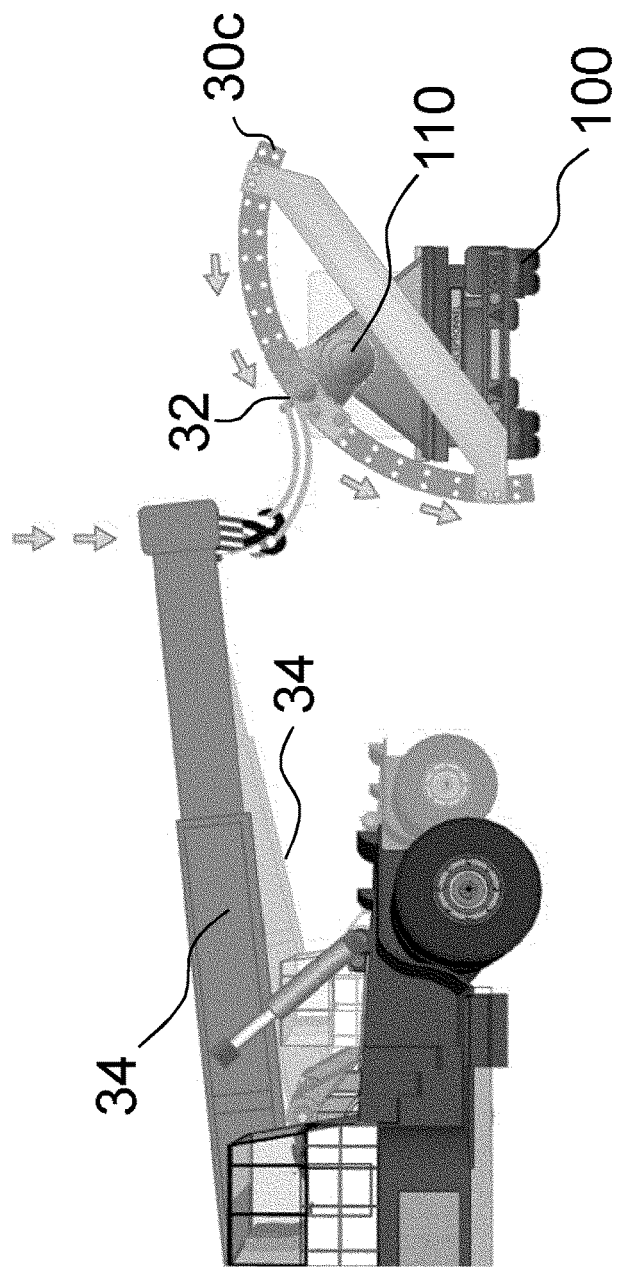
FIG. 11 illustrates the rotation of a segment locked to the trailer.

As shown in FIG. 11, trailer 100 is equipped with a rotatable platform 110 onto which the segment 30c is mounted and locked into place. The platform 110 rotates the segment 30c at the same time as the cranes 34 are lowered. Following this, the brackets 32 are removed from the segment 30c and the truck delivers the segment to the site of wind turbine construction. It is desirable for the segment 30c to be rotated from a symmetrical configuration in which it is mounted above the middle of the trailer bed to an edge configuration in which it is mounted more along the side of the trailer. This configuration reduces the width of the combined trailer and cargo, and may be necessary, for example, in order to allow access to the site of wind turbine construction along a width-restricted road.

Figure 12B:
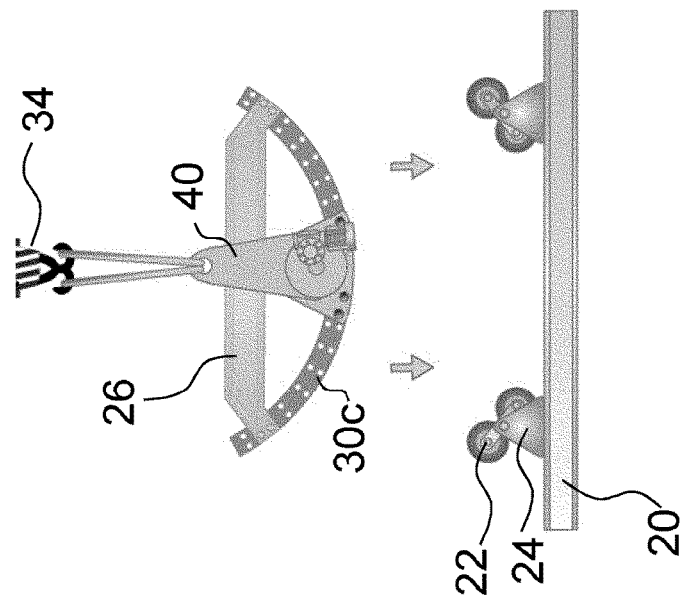
FIGS. 12A and 12B illustrate the unloading of a first segment from the trailer onto a roller bed.
Figure 12A:
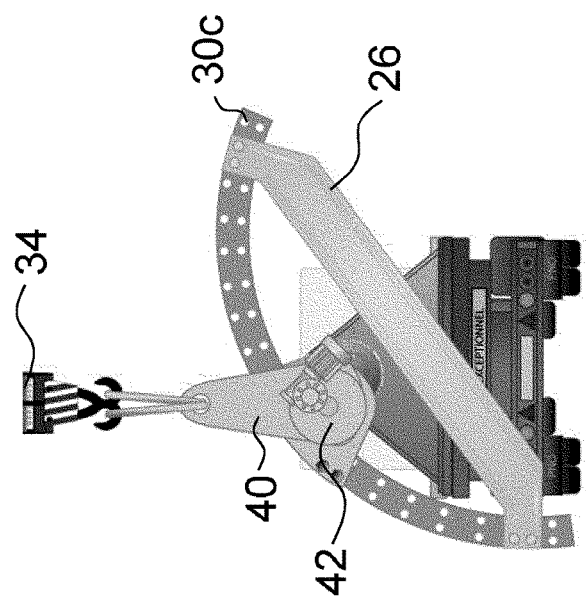
Figure 13B:
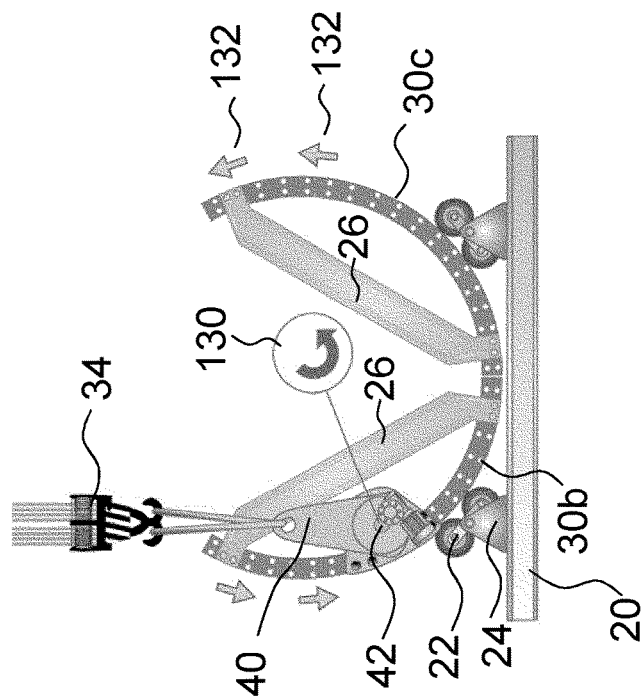
Figure 13A:
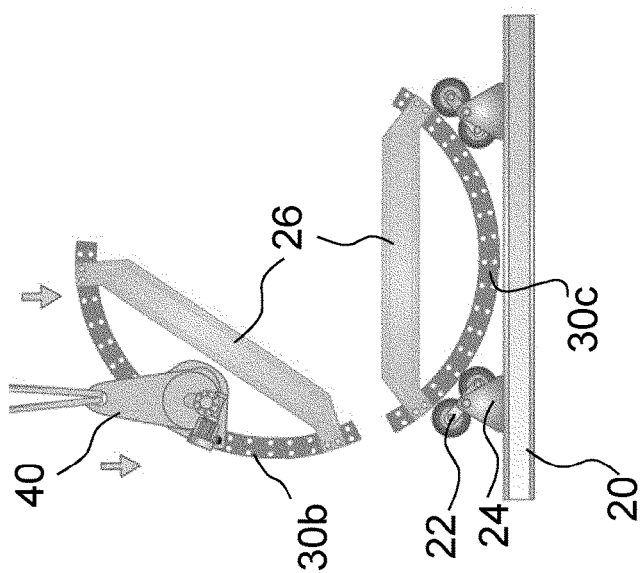

Once the trailer carrying the segment arrives at the installation site, the segment is removed and loaded onto a roller bed, such as those described above. FIGS. 12A and 12B shows how once a rotational lifting tool with mounting bracket 40 has been attached to the segment 30c, the segment is lifted by the crane 34 from the trailer and rotated into the horizontal orientation, depicted in FIG. 12B, and subsequently lowered onto the roller bed. FIG. 13A shows reconstruction of the tower section continuing with the next segment, 30b, as shown being lifted by the crane. The segment 30b arrives at the construction site in a similar manner to that of segment 30c. FIG. 13B shows the segment 30b being lowered to come into contact with segment 30c. The vertical flanges along the edges of the respective segments are then joined. The rotation means 42 then causes segment 30b to rotate in the direction shown by the arrow 130, counter clockwise in this case, so that both segments 30b and 30c rotate. Segment 30b defines an arc of a circle when viewed in cross section, and the rotation is such as to ensure the segment 30b remains on the circumference of the same circle as it is lowered. The gravitational force acting on segment 30b also causes it to push segment 30c around in a direction shown by the arrows 132 until the gap between sections 30b and 30c faces upwards. The final section 30a can then be lifted from the transport stack and lowered into position filling the gap between the two sections as illustrated in FIG. 13C. Once segment 30a is in place, the vertical flanges between the sections are joined to complete the tower section.

It will be appreciated that a similar process to that described above may be carried out on a flat bed without rollers, for example the bed 134 shown in perspective view in FIG. 14A. The bed 134 comprises one or more beams 141 or rails upon which the wind turbine tower segment or section can rest. The beams or rails 141 may be arranged in parallel with cross support bars 142 being provided at regular or irregular intervals. In FIG. 14A, four cross support bars are shown, though any number are possible. The bed 134 also comprises adjustable feet 143 provided underneath the beams or rails 141 to support the beams or rails 141 above the floor and to ensure that they are substantially horizontal in use. The beams or rails may also have a termination section or stop 144 at each end to prevent the possibility of the tower segment or section rolling off the end of the beam or rail in use. In FIG. 14A the terminating section or stop 144 is shown as a metal plate secured to the end of the beam or rail and projecting orthogonally to it. The flat bed 134 also preferably has a layer or coating of softer material, such as rubber or wood, mounted on their top surface. In this way, a section of wind turbine tower placed upon the beams are cushioned by the rubber or wood layer and the surface of the steel shells making up the tower section will be protected from damage. Other resilient plastic materials for example, that will support but not damage the exterior surface of the tower segment or section, may be used for the layer.

Although not shown in FIG. 14A, the beams or rails 141 may be separated along the length of the segment or section, with or without the cross support bars 142, to allow one beam or rail to be positioned at each end of the tower section or segment. In further embodiments, more than two beams or rails may be provided at intervals along the length of a wind turbine tower section. Alternatively, one or more flat beds 134 like that shown in FIG. 14A may be used to support a single tower segment or section. The flat beds shown in FIG. 14A may be more readily obtainable at sites of wind turbine construction than roller beds. The lack of rollers also makes flat beds easier to transport, and easier to assemble and disassemble as required.

The beams or rails may be made of steel for example, such as steel I-beams. The flat bed 134 may be modular in design, to enable the length or the beams or rails and supporting feet and cross bars to be adjusted simply by bolting further parts onto the end of an existing flat bed. In this way the flat beds may be easily adjusted as required, for example when handling a tower section of a different diameter.

The beams or rails may not be placed exactly at each end of a section of wind turbine tower, but may be slightly set back from the ends to allow part of the tower to overhang. This arrangement allows the rotation of segments of tower which may have supporting members attached to them at the ends of the segment. These supporting members, if placed directly above the flat bed 134 would otherwise prevent rolling of the section or segment.

As shown in FIG. 14B, once the segment 30c is held securely by the chocks 136a, 136b the next section 30b is lowered into the position as shown in figure by the crane 34. As before, mounting bracket 40 equipped with rotation means 42 allows the segment 30b to be rotated into this orientation. The vertical flanges between the two segments are then joined together using bolts, so that the segments form a complete unit.

FIG. 14C shows a telescopic supporting arm 138 inserted between the free ends of segments 30c and 30b. The supporting arm 138 is located substantially where the third and final supporting member 26, belonging to segment 30a, will be when this segment completes the tower section. Use of supporting arm 138, together with the two supports 26 attached respectively to segments 30b and 30c, completes a triangular supporting structure which gives strength to the tower segments as they roll on the flat bed 134. This rolling may be started once the chock 136b has been moved out from underneath the segment 30c, as shown in FIG. 14C.

The telescopic supporting arm may be placed against the interior surface of the segments, may be securely temporarily connected to the horizontal or vertical flanges. Supporting arm 138 may, for example, consist of two tubes slidable over one another and lockable into a fixed position when spanning the distance between the free ends of segments 30c and 30b.

Figure 14D:
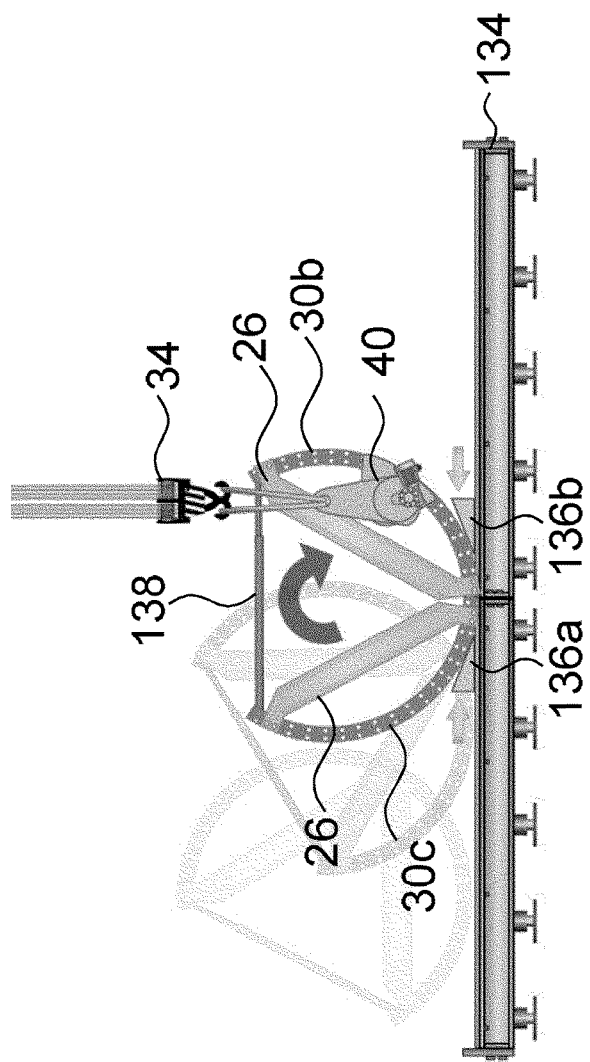

The arrangement depicted in FIG. 14C, with the chock 136b moved out from under segment 30, has not reached a stable equilibrium and therefore the gravitational force acting upon the segments 30c and 30b will tend to make the structure roll along the flat bed 134. This rolling may be carried out in a controlled way by gradually lowering the crane 34 at the same time as rotating the mounting bracket 40, as is shown in FIG. 14D. Once the arrangement reaches a stable equilibrium the chock 136b is inserted between the segment 30b and the flat bed 134, and the chock 136a is moved along the flat bed 134 to be inserted between segment 30c and flat bed 134. The structure is once again stabilised against rolling motion.

In an alternative embodiment, the chock 136b may be moved by a predetermined distance along the flat bed 134 as depicted in FIG. 14C. This distance is calculated in advance to correspond to the distance along the flat bed 134 by which the segments 30b and 30c will roll in order to reach stable equilibrium. In this way, the segments roll directly onto the chock 136b without the need for this chock to be separately placed under the structure when the rolling motion is complete.

As will be appreciated by the skilled person, the above examples need not be limited to two chocks and can equally well be used with several groups of chocks positioned along the length of the segments.

Figure 14E:
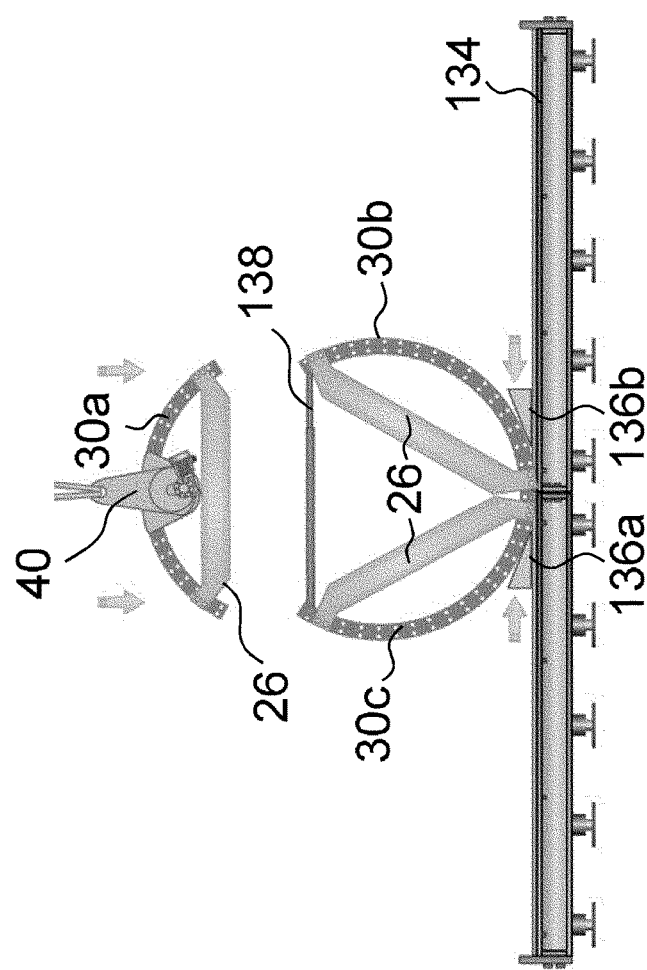

FIG. 14E shows the remaining segment 30a being lowered into position between segments 30b and 30c by the crane 34. The segment 30a arrives at the construction site in a similar manner to that of segment 30c and segment 30b. when the segment 30a is in contact with the other segments 30b and 30c, supporting arm 138 may be removed.

Figure 15:
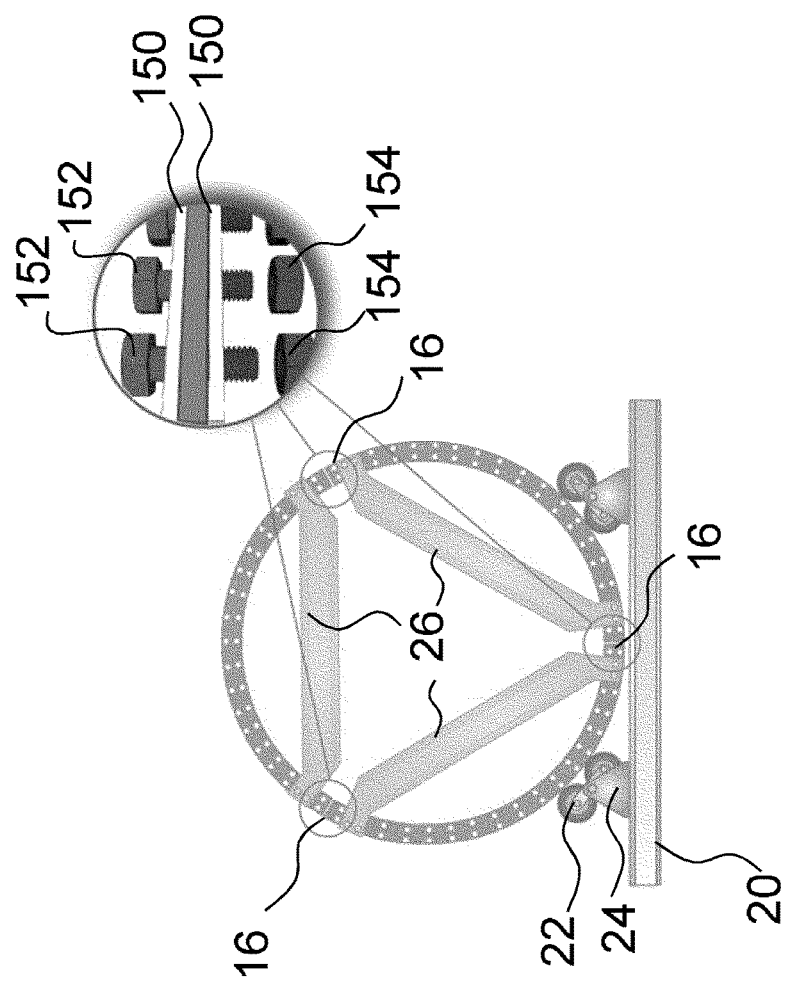
FIG. 15 illustrates the complete tower section and flanges on the segments being joined together.

As shown in FIG. 15, once all of the segments are in place, the joining process of adjacent segments is completed. This means ensuring that all bolts in the flanges are inserted, secured and inspected. In previous steps, the joining of the vertical flanges to one another may have been achieved by inserting only a limited number of bolts, rather than all of the bolts.

When the segments are fully secured to each other the handling support members 26 are detached, for example the nuts holding them on are unscrewed, from the individual segments, leaving a complete tower section located at the site of construction of the wind turbine park.

In alternative embodiments where a telescopic supporting arm 138 is used (see FIGS. 13 and 14) the supporting arm 138 may remain engaged with the tower section until the joining of the segments is completed.

It is desirable to provide a platform upon which one or more people may stand to carry out construction work or maintenance on one or more tower sections, in particular for allowing access to the horizontal flanges of adjacent sections while these are connected together. The platforms may also be used as somewhere to rest tools, component parts of the wind turbine under construction, construction machinery, ladders, and other works-related equipment. The tower segment handling method described by the previous embodiments can be modified to provide such a platform, as will be described in the following discussion.

Figure 16B:
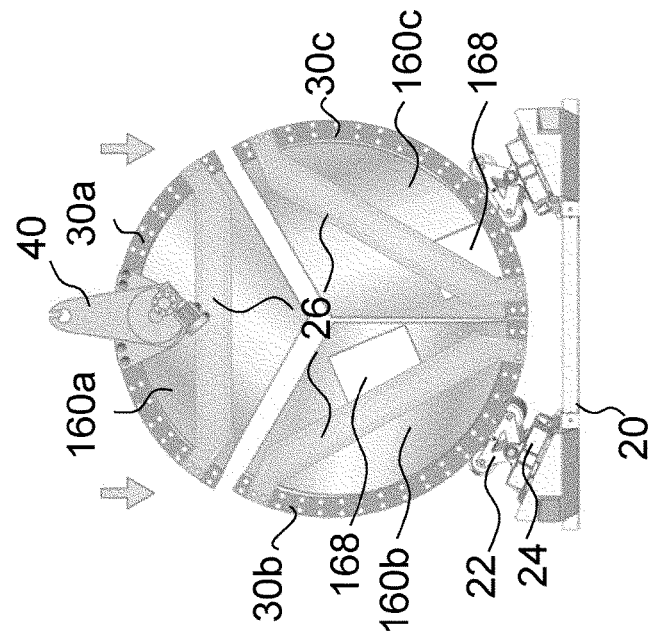
FIGS. 16A and 16B illustrate the use of platform sections in the construction of wind turbine towers.
Figure 16A:
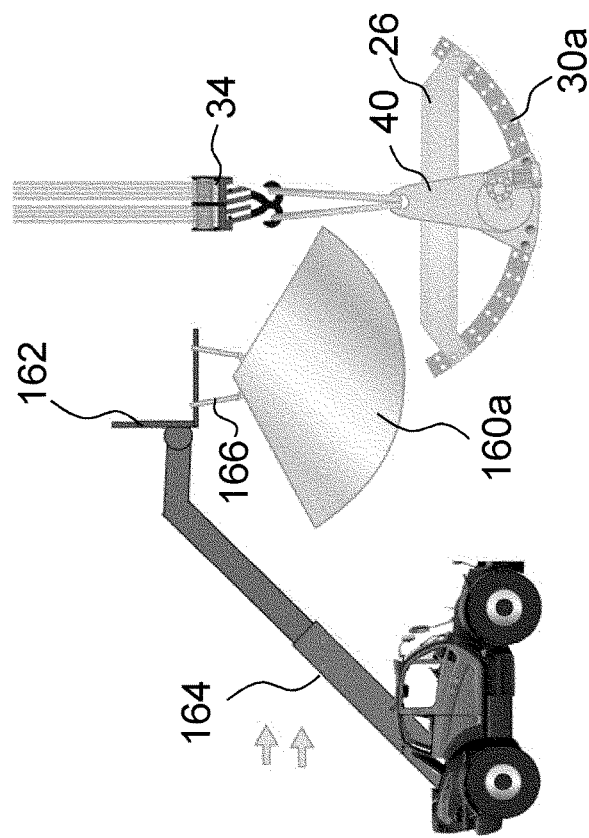

FIG. 16A shows how a platform section 160a is positioned on the tower segment 30a. The platform section may be made of a steel sheet, similar in construction to the tower shell, although other materials suitably strong and with a suitable thickness to enable the required weights to be supported on the platform may be used. The shape of the platform section 160a is a sector of a circle, the radius of which matches or is close to that of the tower section into which the platform section is to be fitted. The angle covered by the sector matches or is close to the angle subtended by the arc of tower segment 30a with respect to the centre of the tower. In alternative embodiments the shape of the platform section 160a may vary from these dimensions, provided it fits within the tower segment.

The platform section 160a is lifted into position by a fork lift tool 162 located at the end of the extendable lifting arm 164 of a construction vehicle. Lifting gear 166 is used to attach the platform section 160a to fork 162. When the platform section 160a is positioned adjacent the end of the tower segment 30a it is secured to the segment 30a by means of nuts and bolts for example, although other joining techniques such as welding may equally well be used. The platform section may for example be usefully connected to the interior of the segment adjacent the one or more horizontal flanges. The spacing can be between 1 m to 2 m to allow a service engineer to stand on the platform and access the flange. Alternatively, the work platform may connect to the horizontal flange, to the segment and/or to the vertical flanges of the segment. The tower segment 30a, with the platform section 160a attached, is then lifted into position by the crane 34 and mounting bracket 40 as described above. Preferably, two cranes 34 will be used together to provide sufficient support for the tower segment 30a, one crane located at each end of the segment.

FIG. 16B shows three tower segments (30a, 30b, and 30c), each with a platform section (respectively 160a, 160b, 160c) attached in the manner depicted in FIG. 16A. The supports 26 may have a secondary function in addition to supporting the ends of the segments 30a, 30b, 30c as described above: they may also act to support the platform sections 160a, 160b, 160c. If desired, the platform sections 160a, 160b, 160c may also be joined along their radii at this point in order to provide extra strength to the platform.

In some embodiments, at least one gap 168 is left in the assembly of platform sections 160a, 160b, 160c. FIG. 16B shows two such gaps 168, although one is partially obstructed by handling support member 26. The gaps 168 to allow access, for example by means of a ladder, to the platform, and to allow tools, components, and other items to be passed up and down the tower.

The platform sections 160a, 160b, 160c, and the handling support members 26, are removable from the tower segments and may be installed only for the initial construction of the tower.

It is desirable that the platform sections 160a, 160b, 160c are joined to tower segments 30a, 30b, 30c after the tower segments have been transported, as the shape of the platform sections will alter the way in which the segments stack during transit. However, in alternative embodiments the platform sections may be added at the factory during construction of the tower segments, and the tower segments may be transported to the site of wind turbine construction with the platform sections already attached to them. This method could be used when the height of a stack of segments is of little importance for the transportation, as the presence of the platform sections will increase the distance between adjacent segments in a stack. Alternatively the segments may be offset from one another in a longitudinal direction in order to accommodate the platform sections at the end of each segment.

Figure 17:
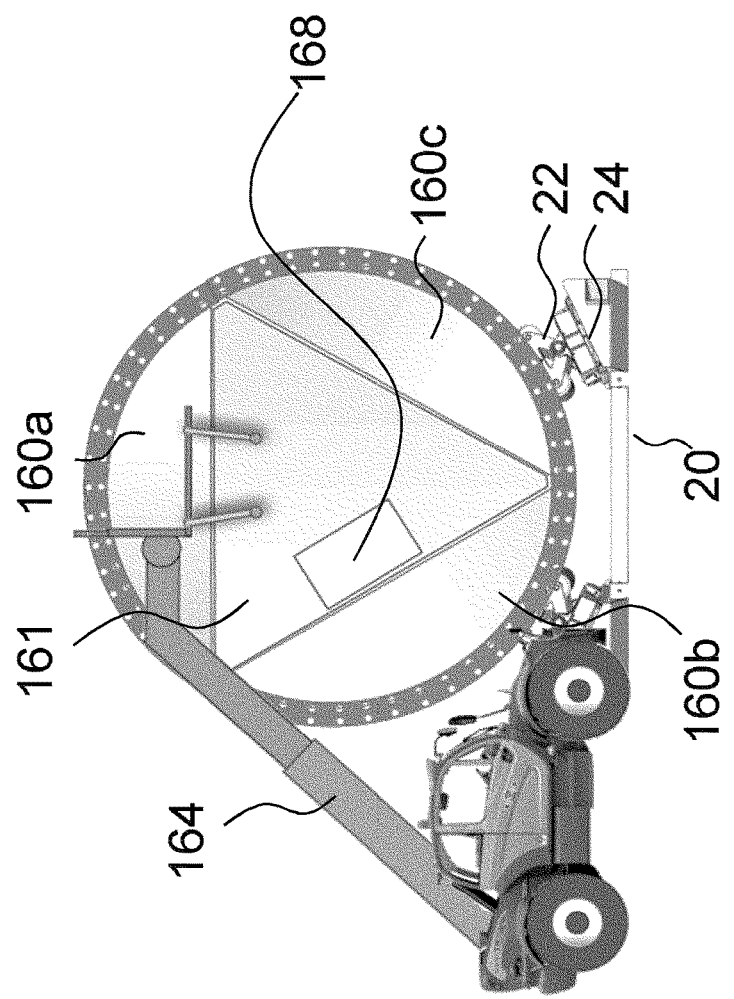
FIG. 17 illustrates an alternative example of the the use of platform sections in the construction of wind turbine towers.
Figure 4C:
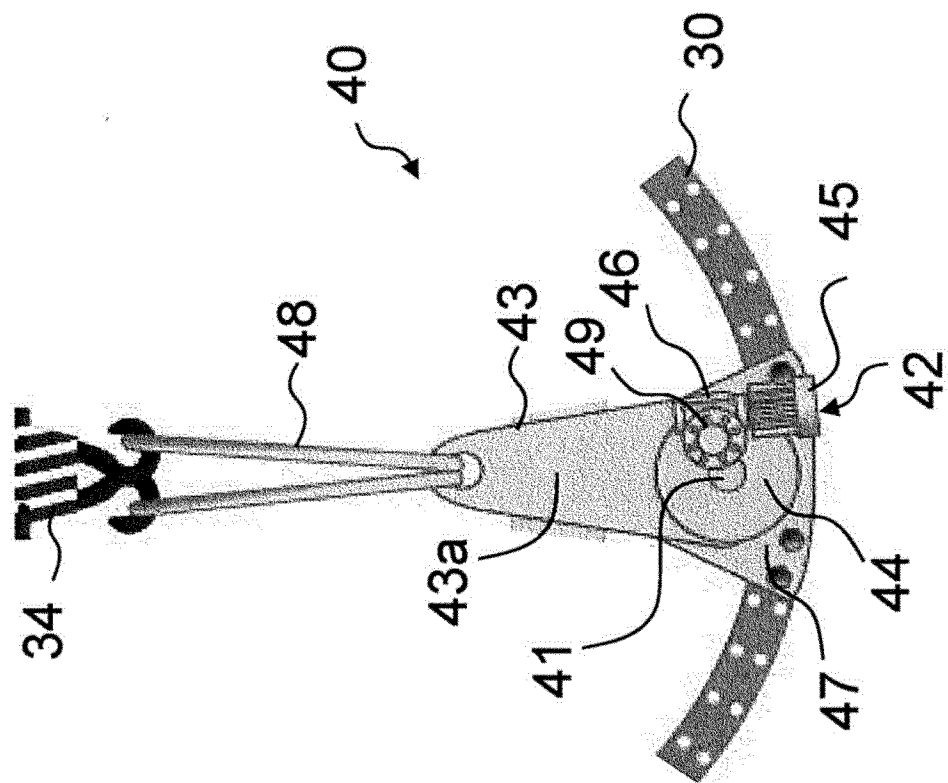

FIG. 17 shows an alternative arrangement of work platform sections to FIG. 16. In FIG. 17, the work platforms sections are coupled to the tower segments as before using the extendable lifting arm 164 of a construction vehicle. In this example, however, the work platforms are shaped to cover a segment of a circle. The work platform section therefore has a first curved exterior edge abutting the curved sheet of the segment, and a straight second interior edge which extends from one of the first opposing edges to the other of the first opposing edges along a chord of a circle. This leaves a central opening between the respective partial work platform segments, when the vertical tower section is assembled. As three segments are shown in FIG. 17, the central opening is triangular in shape. Once the tower section is assembled, a central work platform section 161 can be inserted into the central opening to fill the gap using the extendable lifting arm 164 of a construction vehicle. The triangular central work platform section may then be joined to the work platform segments by welding or bolting, or other fastening means, as will be known in the art. A gap may be provided in the central work platform section 161 to act as an access opening. The central work platform may be alternative shapes, fitting within the triangular opening, such as square shapes, or shapes with rotational symmetry, with any gaps between the central work platform section and the work platform segments then being available for use as an access opening. In towers with four segments, the central opening formed by the segments will be square. A central work platform section may then be square, with other shapes being possible as in the triangular case discussed above.

When a section of tower has been reconstructed by joining its constituent segments together, cranes may be used to lift the tower sections onto transporters to the installation area, where further cranes assemble the tower sections into a complete wind turbine tower.

It should be noted that the lifting equipment, for example cranes and their associated attachments, and the transportation vehicles described herein need not necessarily all be of the same type. Furthermore, more or fewer cranes than are shown in the figures could be used to provide support for the various segments being lifted, according to their sizes. The person skilled in the art will be capable of making a suitable choice of lifting equipment and transportation vehicles for each of the stages of the tower segment handling method described above.

Further, various modifications to the example embodiments described above are possible and will occur to those skilled in the art without departing from the scope of the invention which is defined by the following claims. It will be appreciated that not all of the steps of the transport and handling method will be required in every case.

The invention claimed is:

1. A rotational lifting tool for lifting and rotating a steel wind turbine tower component, the lifting tool comprising:
   a tool body having a first and second section connected at a mutual pivot, the pivot defining a first rotational axis around which the second section of the tool body rotates with respect to the first section;
   a first connector, provided on the first section of the tool body, for coupling with a lifting cable or lifting arm of a crane or lifting vehicle, and by which the tool body is suspended;
   a second connector for engaging with the steel wind turbine tower component;
   an actuator for driving the second section of the tool body around the first rotational axis, and
   a lock for locking the second section of the tool body in place with respect to the first section,
   wherein the actuator is coupled to and rotates with the second section of the tool body.

2. The tool of claim 1, wherein the actuator is an electric motor.

3. The tool of claim 1, wherein the lock is an electric motor.

4. The tool of claim 1, wherein the first connector comprises loops or chains for engaging with a hook on a cable of a crane boom.

5. The tool of claim 1, further comprising a gear wheel defining a second rotational axis operatively coupled to the actuator, wherein the second rotational axis is offset from the first rotational axis, and wherein the actuator is rotatable about the second rotational axis.

6. The tool of claim 5, wherein the second rotational axis is generally parallel to the first rotational axis.

* * * * *

UNITED STATES PATENT AND TRADEMARK OFFICE
CERTIFICATE OF CORRECTION

| | |
|---|---|
| PATENT NO. | : 10,145,138 B2 |
| APPLICATION NO. | : 15/303537 |
| DATED | : December 4, 2018 |
| INVENTOR(S) | : Gunnar K. Storgaard Pedersen |

It is certified that error appears in the above-identified patent and that said Letters Patent is hereby corrected as shown below:

In the Drawings

Delete fig. 4C and substitute therefor the drawing sheet, consisting of fig. 4C as shown on the attached page.

Signed and Sealed this
Twenty-first Day of May, 2019

Andrei Iancu
*Director of the United States Patent and Trademark Office*